(12) United States Patent
Tjell et al.

(10) Patent No.: US 12,502,055 B2
(45) Date of Patent: Dec. 23, 2025

(54) CONFIGURATION OF A MEDICAL VISUALISATION SYSTEM

(71) Applicant: AMBU A/S, Ballerup (DK)

(72) Inventors: Peter Tjell, Skovlunde (DK); Line Sandahl Ubbesen, Holte (DK); Henrik Thillman, Vanløse (DK); Aline Meret Mähr, Copenhagen SV (DK)

(73) Assignee: AMBU A/S, Ballerup (DK)

( * ) Notice: Subject to any disclaimer, the term of this patent is extended or adjusted under 35 U.S.C. 154(b) by 321 days.

(21) Appl. No.: 18/240,240

(22) Filed: Aug. 30, 2023

(65) Prior Publication Data
US 2024/0074644 A1 Mar. 7, 2024

(30) Foreign Application Priority Data
Sep. 7, 2022 (EP) .................................. 22194394

(51) Int. Cl.
*A61B 1/05* (2006.01)
*A61B 1/00* (2006.01)

(52) U.S. Cl.
CPC ............ *A61B 1/05* (2013.01); *A61B 1/00009* (2013.01); *A61B 1/00045* (2013.01)

(58) Field of Classification Search
CPC ... A61B 1/05; A61B 1/00009; A61B 1/00045; A61B 1/00006; A61B 1/00048; A61B 1/0005; A61B 1/00059; A61B 1/045; A61B 1/00004; A61B 1/00057; A61B 1/04; G06F 21/1013; G06F 21/84; G06F 21/10; G06F 3/0482; G06F 3/04842; G06F 3/14; G06K 17/00
See application file for complete search history.

(56) References Cited

U.S. PATENT DOCUMENTS 6,292,692 B1 9/2001 Skelton et al.
7,457,963 B2 11/2008 Ito et al.
(Continued)

FOREIGN PATENT DOCUMENTS

CN 111221580 A 6/2020
EP 1314394 A2 5/2003
(Continued)

OTHER PUBLICATIONS

Extended European Search Report for EP Patent Application No. 22194394.7, Issued on Mar. 29, 2023, 18 pages.
(Continued)

*Primary Examiner* — Timothy R Newlin
(74) *Attorney, Agent, or Firm* — Faegre Drinker Biddle & Reath LLP

(57) ABSTRACT

A medical visualization system includes a video processing apparatus and one or more medical visualization devices. The medical visualization devices preferably include endoscopes and/or laryngoscopes. The video processing apparatus is operable to receive image data from the one or more medical visualization devices. The video processing apparatus includes a housing, a processing unit adapted to receive the image data from the one or more medical visualization devices and cause a display to display a live representation of the image data, and memory. The processing unit is connected to the memory and adapted to read and write data from and to the memory.

21 Claims, 15 Drawing Sheets

(56) References Cited

U.S. PATENT DOCUMENTS

| | | | |
|---|---|---|---|
| 8,417,542 B2 | 4/2013 | Lytle et al. | |
| 8,959,617 B2 | 2/2015 | Newlin et al. | |
| 10,226,163 B2 | 3/2019 | Couvillon, Jr. | |
| 10,905,309 B2 | 2/2021 | Lohier et al. | |
| 2003/0095144 A1* | 5/2003 | Trevino | A61B 5/055 715/764 |
| 2005/0090731 A1 | 4/2005 | Minogue et al. | |
| 2006/0247606 A1 | 11/2006 | Batch | |
| 2008/0154251 A1 | 6/2008 | Stuart et al. | |
| 2012/0050551 A1 | 3/2012 | Ishibashi | |
| 2013/0158344 A1 | 6/2013 | Taniguchi | |
| 2018/0184881 A1 | 7/2018 | Urasaki et al. | |
| 2018/0365025 A1* | 12/2018 | Almecija | G06F 3/0482 |
| 2019/0260944 A1* | 8/2019 | Ogawa | H04N 23/633 |
| 2021/0093156 A1 | 4/2021 | Otsuka | |
| 2022/0197991 A1 | 6/2022 | Lee | |
| 2023/0010235 A1* | 1/2023 | Koch | A61B 1/0002 |

FOREIGN PATENT DOCUMENTS

| | | | |
|---|---|---|---|
| JP | 2017-151583 A | 8/2017 | |
| JP | 2018-007113 A | 1/2018 | |
| WO | 2008034913 A2 | 3/2008 | |
| WO | 2012038418 A1 | 3/2012 | |
| WO | 2021/200629 A1 | 10/2021 | |

OTHER PUBLICATIONS

Partial European Search Report for EP Patent Application No. 22194394.7, Issued on Feb. 23, 2023, 17 pages.

* cited by examiner

CONFIGURATION OF A MEDICAL VISUALISATION SYSTEM

CROSS-REFERENCE TO RELATED APPLICATIONS

This application claims priority from and the benefit of European Patent Application No. EP22194394.7, filed Sep. 7, 2022, which is incorporated by reference herein in its entirety.

TECHNICAL FIELD

The present disclosure relates to a medical visualization system and elements thereof. Particularly, the present disclosure relates to a video processing apparatus (VPA) for medical visualization devices such as endoscopes, laryngoscopes etc., in particular VPAs used in different jurisdictions.

BACKGROUND

A medical visualization device may be utilized to visually examine certain areas of the body of a person, such as inside a body cavity of the person. For example, a medical visualization device may be used to inspect the airways, the digestive tract, or the intestines.

A medical visualization device may be provided with a camera and be attached to a video processing apparatus, such as a video processing apparatus with a display screen, a video output from the camera of the visualization device may be received and displayed at the video processing apparatus or a coupled display screen, thereby allowing an operator to control the visualization device to inspect an area of interest.

For example, a visualization device may be an endoscope, such as a disposable endoscope. An endoscope comprises an operating handle at the proximal end and an insertion cord extending from the handle towards a distal end. The handle is configured to be held by an operator and inter alia comprises externally protruding operating members connected to internal control means allowing the operator to control the movement of a bending section near the distal end of the insertion cord, while advancing the distal end of the insertion cord to a desired location e.g. within a body cavity of a person. By means of a coupled video processing apparatus, such as a video processing apparatus with a display screen, the location to which the distal end has been advanced may be inspected using the endoscope.

The video processing apparatus and/or visualization device(s) may be suitable for use throughout the world, i.e. throughout different countries and/or jurisdictions. However, rules and regulatory approval may differ between countries and/or jurisdictions. Accordingly, for example, a video processing apparatus adapted to operate in accordance with rules in one country might not be suitable for operation in a different country as rules and regulatory approval might differ and require the video processing apparatus to operate differently.

The video processing apparatus of a medical visualization system may be adapted to be operable in combination with various different visualization devices, either successively or simultaneously. However, regulatory approval of certain medical visualization devices, e.g. in combination with the specific video processing apparatus, may differ between countries and/or jurisdictions. Furthermore, regulatory approval may be obtained in some countries before being obtained in other countries. Accordingly, for example, in one country or jurisdiction a first medical visualization device may be approved to operate in combination with the video processing apparatus, while a second medical visualization device is not approved to operate in combination with the video processing apparatus. Conversely, in another country or jurisdiction the first medical visualization device may not be approved to operate in combination with the video processing apparatus, while the second medical visualization device is approved to operate in combination with the video processing apparatus.

SUMMARY

It is an object of the present invention to provide a solution which at least improves the solutions of the prior art. More specifically, the present invention addresses the problem of use of video processing apparatus' (VPAs) and medical visualization devices that have regulatory approval in some jurisdictions and/or configurations but not in other jurisdictions and/or configurations. The problem is exacerbated by the restrictions in digital communications in medicine, which entail, among other restrictions, the safeguarding of privacy of personal and other information that may reside in the VPAs.

Thus, it is an object of the present disclosure to provide a VPA and associated methods for configuring a VPA, such as to enhance flexibility of the VPA. For example, in that a video processing apparatus after manufacturing may be shipped to various countries and jurisdictions with different rules and regulatory approval. Also, it is an object of the present disclosure to provide a system, which both complies with regulatory requirements, while also facilitating easy implementation of future regulatory approvals. Furthermore, it is an object of the present disclosure to provide such enhanced flexibility in a way which reduces the need for dedicated technicians having to meet up at the consumer to upgrade the video processing apparatus and/or reducing the need for the video processing apparatus being shipped back to the maker of the video processing apparatus for such upgrades.

In this context it should be further noted that medical devices, such as the herein disclosed medical visualization system and components thereof, e.g. a video processing apparatus and/or a medical visualization device, for patient safety as well as privacy, are typically not allowed to be directly connected to the internet. Thus, it is a further object of the present disclosure, that the solution should be available without relying on the medical devices being connected to the internet.

Accordingly, a video processing apparatus (VPA) is disclosed, wherein the video processing apparatus is operable to receive image data from one or more medical visualization devices. Also, a medical visualization system is disclosed comprising the video processing apparatus and/or the one or more medical visualization devices. Furthermore, the present disclosure also includes a graphical user interface for the disclosed video processing apparatus.

The one or more medical visualization devices may be coupled or couplable to the video processing apparatus. The one or more medical visualization devices may, for example, comprise an endoscope, a laryngoscope and/or other medical visualization devices. Each of the one or more medical visualization devices may comprise an image sensor adapted to generate the image data. As used herein, the term "endoscope" refers to a medical visualization device with a positioning interface, or handle, and an insertion cord extending from the positioning interface. As such, the term "endoscope" includes procedure-specific endoscopes, such as bronchoscopes, colonoscopes, cystoscopes, duodenoscopes, enteroscopes, gastroscopes, laparoscopes, ureteroscopes, etc.

The one or more medical visualization devices may comprise a plurality of medical visualization devices. The one or more medical visualization devices may include a first medical visualization device and/or a second medical visualization device. The first medical visualization device and the second medical visualization device may be different. For example, the first medical visualization device and the second medical visualization device may be different by being different versions of a medical visualization device and/or may be different by being different types of medical visualization devices, e.g. laryngoscopes or endoscopes and/or different types of endoscopes. Different versions of a medical visualization device may, for example, comprise different image sensor models and/or different firmware, but may otherwise have the same external appearance and/or the same functionality and/or may be designed for the same medical procedure.

The video processing apparatus comprises a housing, a processing unit and an electronic memory. The housing may accommodate the processing unit and the electronic memory (as well as other components described in the following). The processing unit is adapted to receive and/or cause receipt of the image data from the one or more medical visualization devices. The processing unit is further adapted to cause a display to display a live representation of the image data. The processing unit is connected to the electronic memory. The processing unit is adapted to read and write data from and to the electronic memory.

A live view is represented by live images or live video contained in the image data. Image data may be referred to "live images" or "live video" if it is received by the video processing apparatus from the medical visualization device substantially in real-time, with minimal (in the order of milliseconds) latency so that the physician observing the live video can rely on the view being representative of the current position of the medical visualization device.

As used herein, the term "processing unit" comprises a device or devices capable of processing instructions and may be referred to as a processor or controller. A processor typically converts coded instructions into timing and control signals that direct the operation of the other components of the device or system, such as memory, arithmetic logic unit, input and output devices, etc.

Examples of processors include complex programmable logic devices (CPLD), central processing units (CPU), graphic processing units (GPU), field programmable gate arrays (FPGAs), etc. A controller may be a single integrated circuit part or may comprise more than one integrated circuit part. For example, a controller may comprise a combination of a CPU and an FPGA, or a combination of a CPU, a GPU, and an FPGA. If the controller comprises more than one integrated circuit part, the integrated circuit parts are linked in a supervised or a distributed manner. For example, a primary integrated circuit part can instruct other integrated circuit parts to execute tasks programmed for the other integrated circuit parts. Alternatively, the other integrated circuit parts may execute their functions independently.

As used herein, the term "memory" comprises any form of data and instructions storage that may be accessed/read by a controller, including primary and secondary storage. Primary storage, often referred to as random access memory (RAM), is where data is processed and is accessible directly by the controller. RAM may be incorporated in the controller and, if so, may be referred to as controller memory. RAM may also be located in a separate integrated circuit and connected to the controller over a bus. In either structure the RAM used for this purpose may be referred to as cache memory. Secondary storage is where data and instructions are stored. Instructions are, generally, stored in non-volatile memory, which may be referred to as read-only memory (ROM). Other memory may require power to remain in a temporary non-volatile state. Secondary storage memory may comprise flash memory, EEPROM, solid-state drive (SSD) memory, harddisk memory, etc. Some subcontrollers, such as field programmable gate arrays, comprise circuits that combine processing and secondary storage functions.

The video processing apparatus may be a portable video processing apparatus. The portable video processing apparatus may have height H, a width W, and a depth D, with a surface area defined as H×W measuring no more than 12×16 squared inches. The depth may be less than 6 inches. The portable video processing apparatus may comprise a carrying handle and a display forming part of the abovementioned surface area. The portable video processing apparatus may also be devoid of a carrying handle and a display.

The video processing apparatus may alternatively be denoted a control device and/or a monitor device. The video processing apparatus may be a medical monitor, such as a portable medical monitor.

The video processing apparatus may comprise the display, i.e. the display may be a display of the video processing apparatus. For example, the display may be accommodated in the housing or couplable to the housing, e.g. the display may be supported by the housing or be affixed to the housing. Alternatively, the video processing apparatus, such as the housing, may be couplable or be coupled to the display, e.g. the display may be an external display. For example, the video processing apparatus may be devoid of a display. The display, whether forming part of the video processing apparatus or not, may be a touch sensitive display.

The video processing apparatus, e.g. the processing unit of the video processing apparatus, displays, with the display, a graphical user interface.

The video processing apparatus, in accordance with the electronic memory storing information of a country, e.g. an acceptable country (e.g. a country in which the video processing apparatus is regulatory approved), not being registered for the video processing apparatus, displays the live representation of the image data together with displaying a message indicating non-compliance of the video processing apparatus due to lack of registration of an acceptable country for the video processing apparatus.

Hence, in accordance with the present disclosure, the user is made clearly aware if the country selection has not been properly performed, and for that reason the video processing apparatus cannot determine if it has been approved for use in the country where it is currently being used. However, the present inventors have found it to be advantageous to allow such country selection to be skipped, which in accordance with the above would result in display of a message indicating non-compliance of the video processing apparatus due to lack of registration of an acceptable country. For example, in an emergency situation, it may be advantageous to allow use of the video processing apparatus, even though a country has not been properly selected.

Furthermore, it is considered less favorable if the user, e.g. after initial selection, is able to change the country settings without any restrictions as it is feared that some users might attempt changing the country setting to circumvent country or jurisdictional specific regulations. Thus, it is considered favorable that the user is somehow restricted in changing the country setting. Therefore, an additional advantage of the present disclosure is that it allows a technician to test functionality of the video processing apparatus, e.g. testing image quality, without having to first select a country, which would potentially lock the video processing apparatus to that selected country.

The video processing apparatus, in accordance with the electronic memory storing information of a country, e.g. an acceptable country (e.g. a country in which the video processing apparatus is regulatory approved), being registered for the video processing apparatus, displays the live representation of the image data without displaying the message indicating non-compliance of the video processing apparatus due to lack of registration of an acceptable country for the video processing apparatus. Thus, when the user has properly selected a country, such as an acceptable country, the message indicating non-compliance of the video processing apparatus due to lack of registration of an acceptable country may be omitted.

Thus, with the present disclosure, it is envisioned that the video processing apparatus may be shipped to the customer before designating a country for the video processing apparatus and accordingly before configuring any country specific settings. The customer is then, e.g. upon startup and until a country is selected, asked to select the country in which the video processing apparatus is being used. After properly selecting the country, any country specific settings are deployed, and changing the country selection may be readily unavailable for the user but may be possible upon contact with the maker of the video processing apparatus.

Accordingly, the video processing apparatus may, after being turned on and before displaying the live representation of the image data, in accordance with the electronic memory storing information of an acceptable country not being registered for the video processing apparatus, display a country selection dialogue box comprising a plurality of country selection elements respectively corresponding to a plurality of countries. The plurality of country selection elements may include a first country selection element corresponding to a first country and/or a second country selection element corresponding to a second country. The plurality of country selection elements may respectively correspond to countries where the video processing apparatus has been approved, e.g. the first country and/or the second country may be countries where the video processing apparatus has been approved. Alternatively, the plurality of country selection elements may respectively correspond to countries regardless of approval of the video processing apparatus. For example, the second country may be a country where the video processing apparatus has not been approved.

The video processing apparatus may be adapted to detect one or more user inputs corresponding to selection of the first country selection element of the plurality of country selection elements, wherein the first country selection element corresponds to a first country of the plurality of countries. In response to detecting the one or more user inputs corresponding to selection of the first country selection element, the video processing apparatus may store information, such as a registration indicator, in the electronic memory of the first country being registered for the video processing apparatus. The plurality of countries information, e.g. the countries and corresponding registration indicators (registered or unregistered), may be stored in a datastructure in the electronic memory. Example datastructures include tables which may be addressed directly or indirectly, databases, such as relational, hierarchical, non-relational, and object oriented databases, and any other arrangement associating a country with a registration indicator (e.g. a code or logical field). An example relational database is a structured query language (SQL) database, which includes structured tables. To determine if a device is activated the video processing apparatus finds the country in the datastructure and then reads the associated registration indicator. Upon receiving a selection the video processing apparatus toggles the logical field for the particular country, stores the registration indicator, or otherwise modifies the datastructure to store the selection.

Alternatively or additionally, the video processing apparatus may be adapted to detect one or more second user inputs corresponding to selection of the second country selection element of the plurality of country selection elements, wherein the second country selection element corresponds to a second country of the plurality of countries. In response to detecting the one or more second user inputs corresponding to selection of the second country selection element, the video processing apparatus may store information in the electronic memory of the second country being registered for the video processing apparatus.

An example of settings which may differ between countries and/or jurisdictions, is standards for wireless communication. For example, between countries and/or jurisdictions there may exist different approved levels for antenna gain, transmission power, different use of channels etc. Accordingly, the video processing apparatus may be adapted to, in response to detecting the one or more user inputs corresponding to selection of the first country selection element, adjust one or more wireless communication settings, such as the above mentioned, based on the first country. Similarly, the video processing apparatus may be adapted to, in response to detecting the one or more second user inputs corresponding to selection of the second country selection element, adjust one or more wireless communication settings, such as the above mentioned, based on the second country.

As mentioned previously, it is considered less favorable if the user, e.g. after initial country selection, is able to change the country settings without any restrictions as it is feared that some users might attempt changing the country setting to something other than their actual country in an attempt to circumvent country or jurisdictional specific regulations. Thus, it is considered favorable that the user is restricted in changing the country setting. However, it is acknowledged that sometimes users make mistakes and may mistakenly select a wrong country, or the video processing apparatus may have been transferred from one country to another, in which case the country selection should be changed to reflect the new location. Accordingly, the video processing apparatus may be adapted to receive a password input corresponding to a reset password. The password input may be received via a code entry field, such as in a device info screen of the graphical user interface. The reset password may be provided by the maker of the video processing apparatus, e.g. over the phone, via an email or another form of communication. The video processing apparatus may determine whether the password input corresponds to an internal reset password. In accordance with a determination that the password input corresponds to an internal reset password, the video processing apparatus may delete the information in the electronic memory of a country, such as an acceptable country, being registered for the video processing apparatus. Alternatively, the table/datastructure may comprise a logical field indicating that a country selection has been made and toggle the logical field, upon receiving a correct reset password, to indicate that a country selection has not been made.

The internal reset password may be based on a serial number of the video processing apparatus. The internal reset password may be based on a present date. The internal reset password may be based on a non-public variable. The internal reset password may be based on a combination of any or all of the serial number of the video processing apparatus, the present date, and/or the non-public variable. For example, the internal reset password may be based on the serial number of the video processing apparatus and a present date, and optionally the non-public variable. The internal reset password is advantageously based on the serial number to make the necessary reset password unique for the specific video processing apparatus, avoiding users sharing reset passwords with each other. The internal reset password is advantageously based on the present date to limit the duration for which the reset password works, avoiding users having obtained a valid reset password to change country settings unrestricted. The internal reset password is further advantageously based on a non-public variable (e.g. stored in the electronic memory) to restrict the possibility of inferring a valid reset password without contacting the maker of the video processing apparatus.

The video processing apparatus may be adapted to detect a user input corresponding to activation of an image capture function. Activation of the image capture function may be by activation of a button (such as a soft button) on the video processing apparatus. However, alternatively or additionally, the image capture function may be activated differently, e.g. by speech recognition, by activation of a button on the medical visualization device, or by other means of activation. In response to detection of the user input corresponding to activation of the image capture function, the video processing apparatus may store, e.g. in the electronic memory, an image data file corresponding to the image data received when the user input corresponding to activation of the image capture function was detected. In accordance with the electronic memory storing information of an acceptable country not being registered for the video processing apparatus, the image data file may include a message indicating non-compliance of the video processing apparatus due to lack of registration of an acceptable country for the video processing apparatus. The message may be embedded in the image data file as a visual element of the image. Alternatively or additionally, the message may be embedded as meta data in the image data file. In accordance with the electronic memory storing information of an acceptable country being registered for the video processing apparatus, the image data file may omit the message indicating non-compliance of the video processing apparatus due to lack of registration of an acceptable country for the video processing apparatus.

The video processing apparatus may be adapted to detect one or more user inputs corresponding to activation of a video image capture function. Activation of the video capture function may be by activation of a button (such as a soft button) on the video processing apparatus. However, alternatively or additionally, the video capture function may be activated differently, e.g. by speech recognition, by activation of a button on the medical visualization device, or by other means of activation. In response to detection of the one or more user inputs corresponding to activation of the video capture function, the video processing apparatus may store, e.g. in the electronic memory, a video data file corresponding to the image data received when the one or more user input corresponding to activation of the video capture function was detected. In accordance with the electronic memory storing information of an acceptable country not being registered for the video processing apparatus, the video data file may include a message indicating non-compliance of the video processing apparatus due to lack of registration of an acceptable country for the video processing apparatus. The message may be embedded in the video data file as a visual element of the video. Alternatively or additionally, the message may be embedded as meta data in the video data file. In accordance with the electronic memory storing information of an acceptable country being registered for the video processing apparatus, the video data file may omit the message indicating non-compliance of the video processing apparatus due to lack of registration of an acceptable country for the video processing apparatus.

As mentioned previously, a situation may occur where the video processing apparatus is approved in some jurisdiction(s) in combination with some visualization devices, while being approved in other jurisdictions in combination with other visualization devices. It may further occur that the video processing apparatus may be approved in the future to work in combination with additional visualization devices, not approved at the time of shipping the video processing apparatus to the consumer. Accordingly, the present disclosure provides a convenient solution for addressing such challenge.

The electronic memory may store device data enabling compatibility of the video processing apparatus with at least some of the plurality of medical visualization devices, such as the first medical visualization device and/or the second medical visualization device. The device data may comprise and/or be device drivers. The device data may include first device data enabling compatibility with the first medical visualization device. The device data may include second device data enabling compatibility with the second medical visualization device. The device data may include third device data enabling compatibility with a third medical visualization device.

The electronic memory may store activation data. The device data may include first activation data corresponding to the first device data. The device data may include second activation data corresponding to the second device data. The device data may include third activation data corresponding to the third device data. The activation data may be indicative of whether each of the medical visualization device for which the electronic memory stores device data is approved for use in the country being registered for the video processing apparatus. Hence, the first activation data may be indicative of whether the first medical visualization device is approved for use in country being registered for the video processing apparatus. The second activation data may be indicative of whether the second medical visualization device is approved for use in country being registered for the video processing apparatus. The third activation data may be indicative of whether the third medical visualization device is approved for use in country being registered for the video processing apparatus.

In accordance with the first activation data being indicative of the first device data being deactivated, the video processing apparatus, while receiving the image data from the first medical visualization device, may cause the display to display the live representation of the image data together with displaying a message indicating non-compliance of the first medical visualization device, e.g. due to lack of activation of the first device data. In accordance with the first activation data being indicative of the first device data being activated, the video processing apparatus, while receiving the image data from the first medical visualization device, may cause the display to display the live representation of the image data without displaying the message indicating non-compliance of the first medical visualization device.

In accordance with the second activation data being indicative of the second device data being deactivated, the video processing apparatus, while receiving the image data from the second medical visualization device, may cause the display to display the live representation of the image data together with displaying a message indicating non-compliance of the second medical visualization device, e.g. due to lack of activation of the second device data. In accordance with the second activation data being indicative of the second device data being activated, the video processing apparatus, while receiving the image data from the second medical visualization device, may cause the display to display the live representation of the image data without displaying the message indicating non-compliance of the second medical visualization device.

In accordance with the third activation data being indicative of the third device data being deactivated, the video processing apparatus, while receiving the image data from the third medical visualization device, may cause the display to display the live representation of the image data together with displaying a message indicating non-compliance of the third medical visualization device, e.g. due to lack of activation of the third device data. In accordance with the third activation data being indicative of the third device data being activated, the video processing apparatus, while receiving the image data from the third medical visualization device, may cause the display to display the live representation of the image data without displaying the message indicating non-compliance of the third medical visualization device.

Hence, in accordance with the present disclosure, the user is made clearly aware if the coupled medical visualization device from which image data is received is not registered as approved in the electronic memory of the video processing apparatus, although technically the video processing apparatus may be able to receive and handle the image data from the coupled medical visualization device. However, the present inventors have found it to be advantageous to allow use of such not yet approved and/or activated medical visualization device, which in accordance with the above would result in display of a message indicating non-compliance of the video processing apparatus and/or the medical visualization device. For example, in an emergency situation or in case of testing the medical visualization device and/or the video processing apparatus it may be advantageous to allow use of the coupled medical visualization device and the video processing apparatus, regardless of approval and/or activation status.

It is a further advantage of the present disclosure that it allows the video processing apparatus to be shipped to the customer with technical ability to support medical visualization devices not yet approved, e.g. for some countries and/or jurisdictions. Once approved, e.g. by regulatory authorities, these may be easily activated, allowing use of such medical visualization devices without display of the message indicating non-compliance of the medical visualization device, as well as being included in a list of supported and approved devices.

As mentioned previously, the video processing apparatus may be adapted to detect a user input corresponding to activation of an image capture function and/or be adapted to detect one or more user inputs corresponding to activation of a video image capture function. In response to detection of the user input corresponding to activation of the image capture function, the video processing apparatus may store, e.g. in the electronic memory, an image data file corresponding to the image data received when the user input corresponding to activation of the image capture function was detected. In response to detection of the one or more user inputs corresponding to activation of the video capture function, the video processing apparatus may store, e.g. in the electronic memory, a video data file corresponding to the image data received when the one or more user input corresponding to activation of the video capture function was detected.

In accordance with the activation data, corresponding to the medical visualization device from which the image data is being received, being indicative of the respective device data being deactivated, the image data file and/or the video data file may include a message indicating non-compliance of the medical visualization device, e.g. due to lack of activation of the corresponding device data. The message may be embedded in the image/video data file as a visual element of the image/video. Alternatively or additionally, the message may be embedded as meta data in the image/video data file. In accordance with the activation data, corresponding to the medical visualization device from which the image data is being received, being indicative of the respective device data being activated, the image data file and/or the video data file may omit the message indicating non-compliance of the first medical visualization device.

For example, while receiving the image data from the first medical visualization device, in accordance with the first activation data being indicative of the first device data being deactivated, the image data file and/or the video data file may include a message indicating non-compliance of the first medical visualization device, e.g. due to lack of activation of the first device data. For example, the message indicating non-compliance of the first medical visualization device, e.g. due to lack of activation of the first device data, may be added to the image data file and/or the video data file, e.g. by the video processing apparatus, such as the processing unit of the video processing apparatus. In accordance with the first activation data being indicative of the first device data being activated, the image data file and/or the video data file may omit the message indicating non-compliance of the first medical visualization device.

While receiving the image data from the second medical visualization device, in accordance with the second activation data being indicative of the second device data being deactivated, the image data file and/or the video data file may include a message indicating non-compliance of the second medical visualization device, e.g. due to lack of activation of the second device data. For example, the message indicating non-compliance of the second medical visualization device, e.g. due to lack of activation of the second device data, may be added to the image data file and/or the video data file, e.g. by the video processing apparatus, such as the processing unit of the video processing apparatus. In accordance with the second activation data being indicative of the second device data being activated, the image data file and/or the video data file may omit the message indicating non-compliance of the second medical visualization device.

While receiving the image data from the third medical visualization device, in accordance with the third activation data being indicative of the third device data being deactivated, the image data file and/or the video data file may include a message indicating non-compliance of the third medical visualization device, e.g. due to lack of activation of the third device data. For example, the message indicating non-compliance of the third medical visualization device, e.g. due to lack of activation of the third device data, may be added to the image data file and/or the video data file, e.g. by the video processing apparatus, such as the processing unit of the video processing apparatus. In accordance with the third activation data being indicative of the third device data being activated, the image data file and/or the video data file may omit the message indicating non-compliance of the third medical visualization device.

Accordingly, in accordance with the present disclosure, non-compliance of the medical visualization device used may be stored in the image and/or video data files.

The video processing apparatus may be adapted to receive an activation code input corresponding to an activation code. The video processing apparatus, such as the processing unit of the video processing apparatus, may be adapted to determine whether the activation code input corresponds to an internal activation code. In accordance with a determination that the activation code input corresponds to an internal activation code for the first device data, the video processing apparatus may alter the first activation data to be indicative of the first device data being activated. In accordance with a determination that the activation code input corresponds to an internal activation code for the second device data, the video processing apparatus may alter the second activation data to be indicative of the second device data being activated. In accordance with a determination that the activation code input corresponds to an internal activation code for the third device data, the video processing apparatus may alter the third activation data to be indicative of the third device data being activated.

Thereby, medical visualization devices not activated for the video processing apparatus, e.g. for certain countries and/or jurisdictions, may be activated by the user at a later point in time, e.g. when regulatory approval has been received.

As mentioned previously, regulatory approval may be obtained at different points in time for different countries and/or jurisdictions. Hence, regulatory approval may be obtained in one country before being obtained in another. Therefore, it is found advantageous that the activation code(s) may be specific for the country registered for the video processing apparatus. Therefore, the internal activation code may be based on the country being registered for the video processing apparatus. For example, the internal activation code may be based on the information of an acceptable country being registered for the video processing apparatus. Alternatively or additionally, the internal activation code may be based on software version of the video processing apparatus and/or the type of the video processing apparatus, such as a hardware version, model and/or type of the video processing apparatus.

It may be a prerequisite, that an acceptable country, e.g. a country and/or jurisdiction where the video processing apparatus is approved for use, is registered for the video processing apparatus, for an activation code to be received. Thus, the video processing apparatus may adapted to receive the activation code input in accordance with the electronic memory storing information of an acceptable country being registered for the video processing apparatus. In accordance with the electronic memory storing information of an acceptable country not being registered for the video processing apparatus, the video processing apparatus may be adapted not to receive the activation code input.

The activation code may be a string of characters. The activation code input may be received by the user typing the string of characters, e.g. with a keyboard or a virtual keyboard, into a designated entry field of the graphical user interface, e.g. within a settings menu or similar. The string of characters may comprise any desired codes to provide more or less specificity. Examples of codes include device type, model number, version, country, serial number or other identifying code that may indicate manufacturing details, etc. The string may be encrypted to form the activation code. Alternatively or additionally, receiving the activation code input may include scanning an optical code, e.g. a QR code, a bar code or similar. The video processing apparatus may comprise an optical scanner, such as a bar code reader or similar. The processing unit may be connected to the optical scanner. Receiving the activation code input may include scanning the optical code with the optical scanner and identifying the activation code in the optical code. Alternatively or additionally, receiving the activation code input may include scanning the optical code with the medical visualization device, such as the image sensor of the medical visualization device, and identifying the activation code in the image data. In such example, the optical scanner may be omitted, or the two options may both be provided, to enhance flexibility.

The video processing apparatus may be adapted to detect one or more user inputs corresponding to a request to show information for retrieving an activation code. For example, the user may enter a settings menu and/or a help menu, for being guided as to how to obtain an activation code. In response to detecting the one or more user inputs corresponding to the request to show information for retrieving the activation code, the video processing apparatus may cause the display to display a retrieval code to be provided to a companion device, e.g. a smart phone, a tablet or similar. The companion device may be a standard consumer device, e.g. as opposed to a medical grade device. The retrieval code may be an internet address to a webpage. The retrieval code may be an optical retrieval code, such as a QR code, a bar code or similar. The retrieval code, e.g. in response to the retrieval code being received by the companion device, such as when being read by an image sensor of the companion device, may prompt the companion device to contact an online resource, e.g. a web server, to retrieve the activation code. The retrieved activation code may be in the form of a string of characters, as described above. Alternatively or additionally, the retrieved activation code may be in the form of an optical code, e.g. a QR code or a bar code, to be scanned by the video processing apparatus via an optical scanner or a medical visualization device coupled to the video processing apparatus, as described above.

The retrieval code may be based on the information of the acceptable country being registered for the video processing apparatus. The retrieval code may be based on software version of the video processing apparatus. The retrieval code may be based on the type of the video processing apparatus, such as a hardware version and/or type of the video processing apparatus. Prompting the companion device to contact the online resource may include parsing the information of the acceptable country being registered for the video processing apparatus, the software version, and/or the type of the video processing apparatus, to the online resource. As mentioned previously the activation code may be based on one or more of these parameters, and therefore to obtain an activation code applicable for the video processing apparatus, one or more of these parameters may need to be submitted. Therefore, conveniently, the retrieval code may be based on one or more of these parameters to make it easier for the user to obtain an applicable activation code. Furthermore, one or more of these parameters may be automatically parsed to the online resource.

BRIEF DESCRIPTION OF THE FIGURES

Embodiments of the disclosure will be described in more detail in the following with regard to the accompanying FIGURES. The FIGURES show one way of implementing the present disclosure and are not to be construed as being limiting to other possible embodiments falling within the scope of the attached claim set.

DETAILED DESCRIPTION

Figure 1:
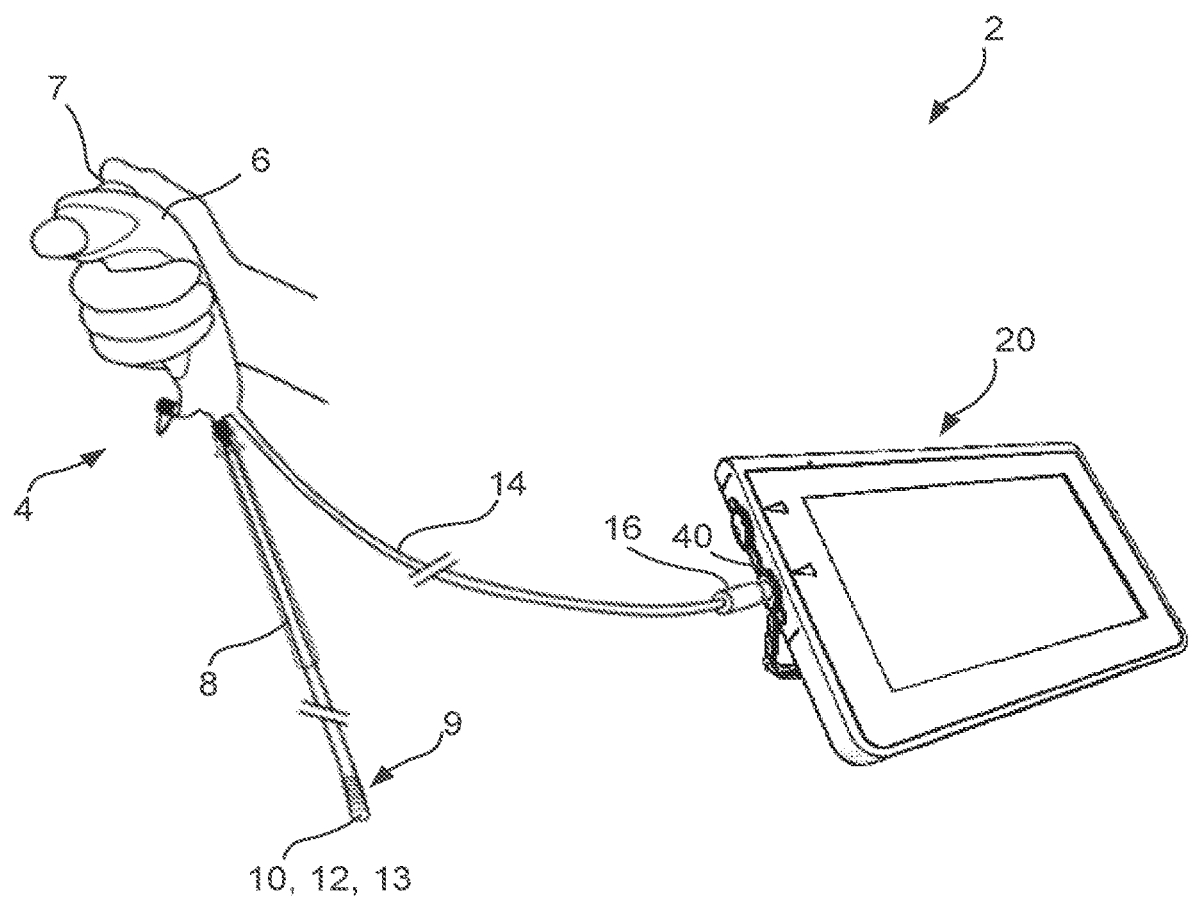
FIG. 1 schematically illustrates an example medical visualization system.
Figure 1:
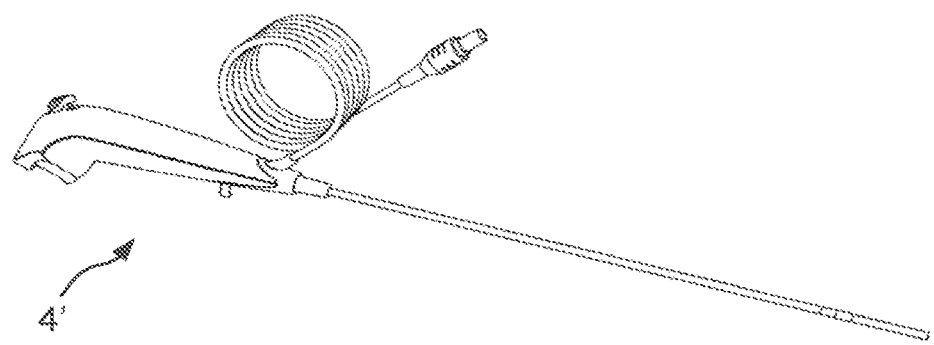

Various example embodiments and details are described hereinafter, with reference to the FIGURES when relevant. It should be noted that the FIGURES may or may not be drawn to scale and that elements of similar structures or functions are represented by like reference numerals throughout the FIGURES. It should also be noted that the FIGURES are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates an example medical visualization system 2 comprising a medical visualization device 4 and a video processing apparatus 20. The visualization device 4 has an image sensor 12, e.g. a CCD or a CMOS, configured to generate image data indicative of a view from the visualization device 4. In the illustrated example, the visualization device 4 is an endoscope comprising a handle 6 and an insertion cord 8, extending from the handle 6 to a distal cord portion 10. The image sensor 12 may be configured to generate image data indicative of a view from the distal cord portion 10 of the insertion cord 8. The visualization device 4 may further comprise a light emitter 13 adapted to provide illumination of the view. The light emitter 13 may be an LED, an optical fiber connectable to a light source, or similar element known to provide illumination.

The visualization device 4 may be connected to the video processing apparatus 20. In the illustrated example, a device cable 14 extending from the handle 6 terminates in a device connector 16 connected to a connection port 40 of the video processing apparatus 20. The video processing apparatus 20 is operable to receive image data generated by the image sensor 12 of the visualization device 4. For example, the video processing apparatus 20 may receive image data generated by the image sensor 12 via the device cable 14, the connector 16 and connection port 40. Alternatively, the visualization device 4 may be wirelessly connected to the video processing apparatus 20.

The video processing apparatus 20 is configured to display images received from the medical visualization device 4. The video processing apparatus 20 may comprise a display, such as a touch sensitive display, as illustrated, and/or may be connected to an external display where the images received from the medical visualization device 4 are displayed.

The handle 6 comprises a control mechanism 7 adapted to receive an input in a first input direction and/or in a second input direction. The touch input in the first input direction on the control mechanism 7 causes a bending section 9 of the insertion cord 8 to bend in a first bending direction, e.g. via wires extending from the handle, through the insertion cord 8 to the bending section 9. The touch input in the second input direction on the control mechanism 7 causes the bending section 9 of the insertion cord 8 to bend in a second bending direction. The first input direction and the second input direction may be opposite. The first bending direction and the second bending direction may be opposite. Bending the bending section 9 of the insertion cord 8 may cause a movement of the distal end 10 and the image sensor 12 in a direction relative to the image sensor 12. Thereby, seeing an image generated by the image sensor 12, a direction, e.g. up or down, in the image may correspond to a respective input on the control mechanism 7.

The medical visualization system 2 may comprise a plurality of visualization devices, e.g. including also a second medical visualization device 4'. The second medical visualization device 4' may, like the first visualization device 4 (i.e. the previously mentioned visualization device 4), comprise an image sensor, a light emitter, a handle, an insertion cord, etc. In some examples, the second medical visualization device 4' may be similar to the first visualization device 4. However, in other examples, the second medical visualization device 4' may be different than the first visualization device 4. For example, the second medical visualization device 4' may be a cystoscope while the first visualization device 4 may be a bronchoscope. Additionally or alternatively, the second medical visualization device 4' (or a third medical visualization device of the system 2) may be a laryngoscope.

Figure 2:
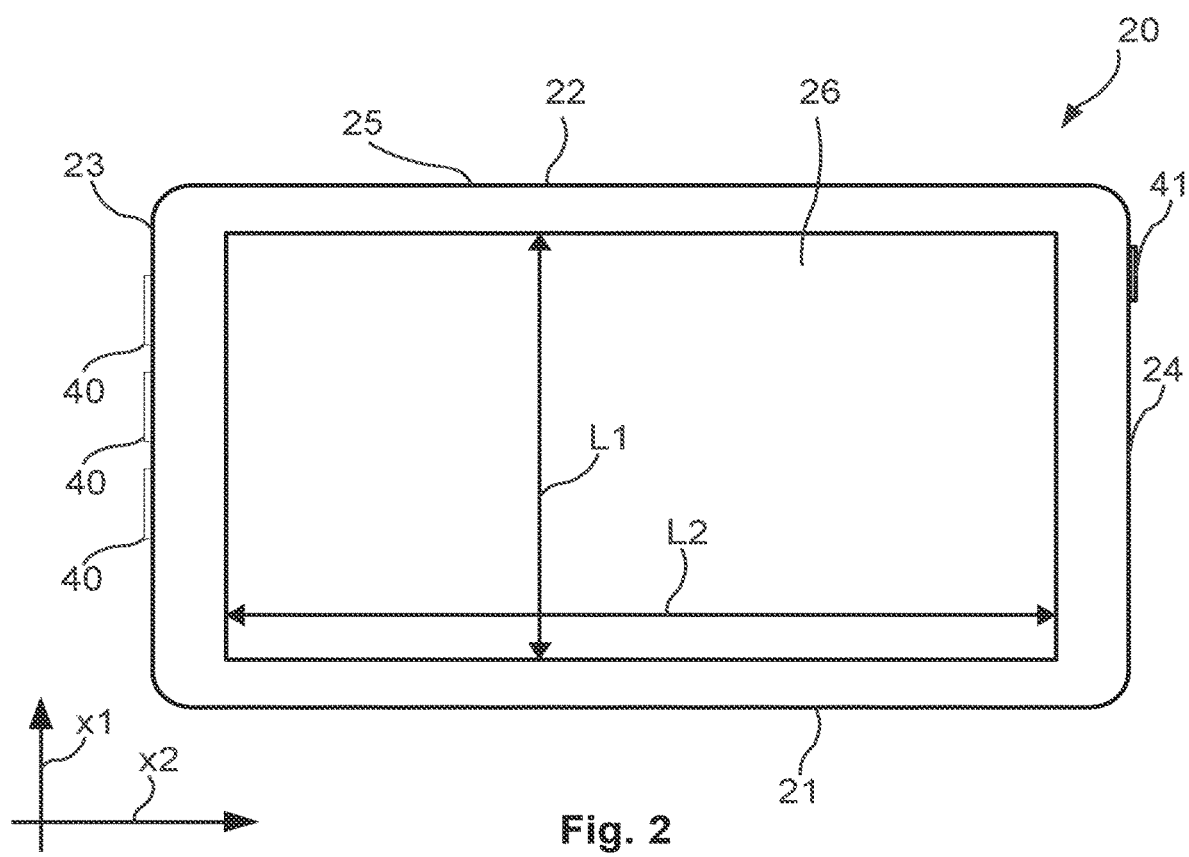
FIG. 2 schematically illustrates an example video processing apparatus.

FIG. 2 schematically illustrates an example video processing apparatus 20, such as the video processing apparatus 20 as illustrated in FIG. 1. The video processing apparatus 20 comprises a first housing 25. The first housing 25 extends in a first direction x1 from a first housing side 21 to a second housing side 22 and in a second direction x2 perpendicular to the first direction x1 from a third housing side 23 to a fourth housing side 24. The video processing apparatus 20 comprises a touch sensitive display 26 accommodated in the first housing 25. The touch sensitive display 26 has a first length L1 in the first direction x1 and a second length L2 in the second direction x2. The second length L2 may be longer than the first length L1 as illustrated. In some examples, the video processing apparatus 20 may comprise a second housing (not shown), which does not comprise a display. For example, the second housing may be coupled to the first housing 25, or the second housing may be coupled to an external display. In such example, a processing unit, memory and/or other components of the video processing apparatus 20 may be arranged in the second housing.

The video processing apparatus 20 may comprise one or more connection port(s) 40, such as three connection ports 40, as illustrated. The connection ports 40 may allow visualization devices to be connected. The connection port(s) 40 may be arranged at the third housing side 23, as illustrated. Alternatively or additionally, connection port(s) 40 may be arranged at the fourth housing side 24. In some examples, the video processing apparatus 20 may provide for wireless connection with the visualization devices, in which case the connection ports 40 may be omitted. However, in some examples, the video processing apparatus 20 may comprise both connection ports 40 and the ability to wireless connect to visualization devices. In some examples, where the video processing apparatus 20 comprises a second housing, as mentioned above, the second housing may comprise the connection ports 40.

The video processing apparatus may comprise an on/off button 41, which may be provided on the fourth housing side 24, as illustrated.

Figure 3:
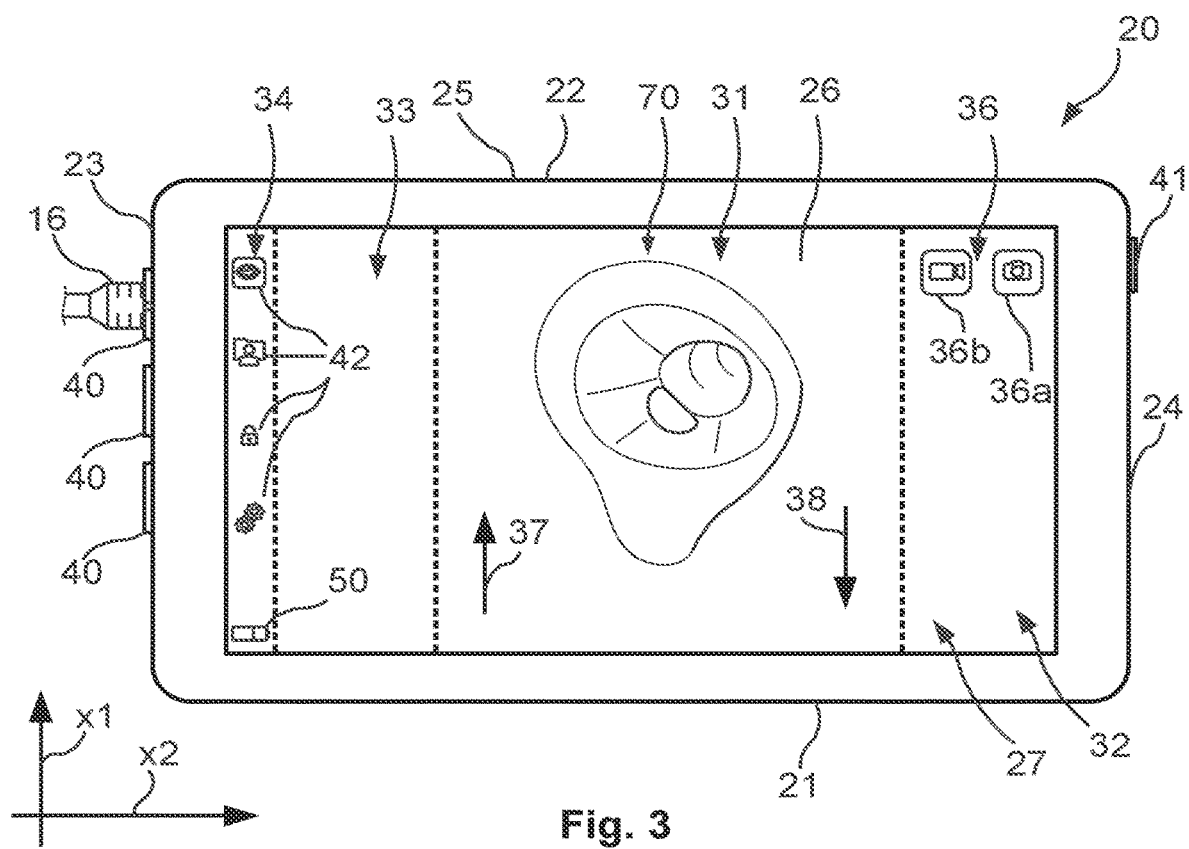
FIG. 3 schematically illustrates an example video processing apparatus.

FIG. 3 schematically illustrates an example video processing apparatus 20, such as the video processing apparatus 20 as illustrated in FIGS. 1-2. As illustrated a device connector 16 may be connected to a connection port 40.

The video processing apparatus 20 may be provided with a graphical user interface 27. The graphical user interface 27 may be displayed with the touch sensitive display 26, and the user may interact with the graphical user interface 27, e.g. by means of providing touch inputs on the touch sensitive display 26. In some examples, the video processing apparatus may be provided without a touch sensitive display, and the user may interact with the graphical user interface by other means, e.g. by a keyboard, a trackpad or a mouse.

The graphical user interface 27 may comprise a plurality of non-overlapping portions 31, 32, 33, 34. Each of the portions 31, 32, 33, 34 may extend substantially throughout the first length L1 in the first direction x1. The non-overlapping portions includes a first portion 31, a second portion 32, a third portion 33 and a fourth portion 34. The first portion 31 is arranged between the third portion 33 and the second portion 32 along the second direction x2. The third portion 33 is arranged between the fourth portion 34 and the first portion 31 along the second direction x2. The fourth portion 34 is arranged between a side of the first housing, e.g. the third housing side 23, and the third portion 33 along the second direction x2. The second portion 32 is arranged between another side of the first housing 25, e.g. the fourth housing side 24, and the first portion 31 along the second direction x2. The first portion 31 and the third portion 33 are arranged between the second portion 32 and the fourth portion 34 along the second direction x2.

The video processing apparatus 20 may cause the display to display a live representation 70 of the image data within the first portion 31 of the touch sensitive display 26. The first bending direction and the second bending direction of the bending section 9 of the insertion cord 8, as described with respect to FIG. 1, may correspond to a first image direction 37 and a second image direction 38 of the live representation 70, respectively. The first image direction 37 and the second image direction 38 may be parallel to the first direction x1, as illustrated. The first image direction 37 and the second image direction 38 may be opposite, as illustrated. Thereby, a user operating the control mechanism 7 of visualization device 4 may cause movement of the bending section 9 of the insertion cord 8 to bend in a direction corresponding to the first image direction 37 or the second image direction 38 of the live representation 70.

The video processing apparatus 20 may cause the display to display with the touch sensitive display 26 one or more actionable items 36 within the second portion 32 of the graphical user interface 27. The actionable items 36 may comprise an image capture button 36a, e.g. for storing an image data file corresponding to the image data received when the image capture button 36a was activated. Alternatively or additionally, the actionable items 36 may comprise a video capture button 36b, e.g. for storing a video sequence of image data corresponding to the image data received when the video capture button 36b was activated.

The video processing apparatus 20 may cause the display to display with the touch sensitive display 26 one or more actionable menu items 42 within the fourth portion 34 of the graphical user interface 27. The actionable menu items 42 may, for example, comprise a login menu item for initiating a login procedure, a settings menu item for accessing a settings menu, an archive menu item for browsing an archive, and a default menu item for returning to a default view. Also, a battery indicator 50 may be displayed in the fourth portion 34.

Figure 4:
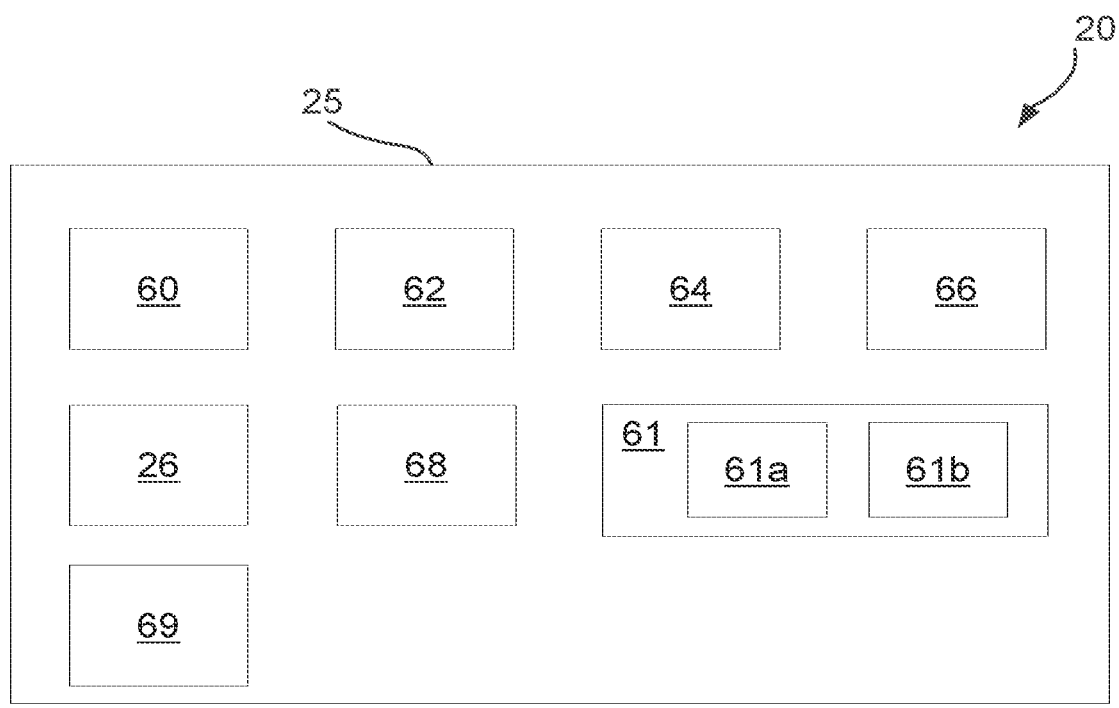
FIG. 4 is a block diagram of an example video processing apparatus.

FIG. 4 is a block diagram of an example video processing apparatus 20, such as the video processing apparatus 20 of the previous FIGURES. The video processing apparatus 20 comprises a processing unit 60 and memory 62. The memory 62 may comprise both volatile and non-volatile memory. The video processing apparatus 20 may also comprise an orientation sensor 64 for determining the orientation of a housing, such as the first housing 25, relative to gravity. The orientation sensor 64 may comprise one or more accelerometers and/or a gyroscope. The video processing apparatus 20 may comprise an input/output module 66, such as for receiving image data from the image sensor 12 via connectors of the visualization device 4. The input/output module 66 may also comprise ethernet connector, Wi-Fi transceiver, Bluetooth transceiver, video connectors, USB ports etc., and respective controllers. The video processing apparatus 20 also may comprise the touch sensitive display 26 as described earlier. The video processing apparatus 20 may cause the display to display information, graphical user interface objects, images, buttons etc., with the touch sensitive display 26. The video processing apparatus 20 also may comprise a microphone 68. The video processing apparatus 20 may comprise a power unit 61 for powering the video processing apparatus 20. The power unit 61 may comprise a rechargeable battery 61a. The power unit 61 may comprise a power connection 61b for connecting the power unit 61 to an external power supply, such as a conventional AC power socket. The power connection 61b may provide for powering the video processing apparatus and/or for charging the battery 61a. The video processing apparatus 20 may comprise an optical scanner 69, such as a bar code reader or similar. The processing unit 60 may be connected to the optical scanner 69. The components of the video processing apparatus 20 may be interconnected by buses or signal lines. Some or all of the components of the video processing apparatus may be accommodated in the first housing 25 as illustrated. However, alternatively some of the components, e.g. the processing unit 60, the memory 62, input/output module 66, the optical scanner 69, and/or the power unit 61 may be accommodated in a second housing (not shown) of the video processing apparatus 20.

The power unit 61 may comprise components for, e.g. indirectly, measuring capacity of the rechargeable battery 61a. For example, the power unit 61 may comprise a voltage gauge to measure the voltage of the rechargeable battery 61a. Based on the measured voltage, the remaining capacity of the rechargeable battery 61a may be estimated, e.g. by the processing unit 60. The power unit 61 may also comprise components for measuring power consumption of the video processing apparatus 20. For example, the power unit 61 may comprise a power meter to measure the rate at which the video processing apparatus 20 consumes power from the rechargeable battery 61a. The voltage gauge may be a low current consumption integrated circuit or a resistor coupled in parallel with the battery. A current sensor may be provided and the power may be computed as the product of the voltage and current. Additionally, an integrated circuit may be provided that includes a voltage gauge and a current sensor, and which outputs a power value in digital form.

The video processing apparatus 20 may cause the display to display content with the touch sensitive display 26 and/or with an externally coupled display, which in some examples may be an external touch sensitive display. For example, the video processing apparatus 20 may cause the display to display content by the processing unit 60 transmitting instructions to the touch sensitive display 26 and/or the externally coupled display indicative of the content to be displayed. The processing unit 60 may be adapted to receive the image data from the visualization device. The processing unit 60 may be adapted to cause a display, such as the touch sensitive display 26 and/or the externally coupled display, to display a live representation of the image data.

The video processing apparatus 20 may receive user input with the touch sensitive display 26. Particularly, the video processing apparatus 20 may detect user inputs with the touch sensitive display 26. For example, a user providing a touch input on the touch sensitive display 26 causes a change in one or more electrical parameters of the touch sensitive display 26 indicative of at least the location of the touch input. Information of the touch input is transmitted from the touch sensitive display 26 to the processing unit 60, and the processing unit 60 may determine whether the touch input corresponds to an action to perform, e.g. whether the location of the touch input corresponds to the location of a soft-button displayed at the touch sensitive display 26. Alternatively or additionally, the video processing apparatus 20 may receive user inputs by other means, e.g. by a keyboard, a trackpad or a mouse, which may be coupled to the video processing apparatus 20. As will be described later, the video processing apparatus 20 may also or alternatively receive user inputs by means of buttons on a coupled visualization device.

The user may interact with the video processing apparatus 20 via the graphical user interface 27 by providing user inputs, e.g. by means of providing touch inputs on the touch sensitive display 26, and the video processing apparatus 20 may detect such user inputs with the touch sensitive display 26. A touch input, e.g. a single tap, long press, double tap, swipe or similar, and the location of the touch input on the touch sensitive display 26 may be registered by the touch sensitive display 26, which transmits information of the touch input (e.g. including type of touch (double tap, long press, single tap, swipe, etc.) and/or location of the touch) to the processing unit 60 of the video processing apparatus 20. The processing unit 60 may interpret the information received and determine whether the touch input corresponds to activation of an action, e.g. whether the touch input correspond to activation of a button displayed with the touch sensitive display 26 at the location of the touch input. In response to a determination that the touch input corresponds to activation of an action, the processing unit 60 performs the respective action.

For example, with reference to FIGS. 3 and 4, to capture an image corresponding to the presently shown live representation 70, e.g. corresponding to the image data received from the image sensor, the user may tap the image capture button 36a. The tap and the location of the tap is registered by the touch sensitive display 26, which transmits the information of the tap to the processing unit 60 of the video processing apparatus 20. The processing unit 60 interprets the information received and determines that the user tapped the location corresponding to the image capture button 36a. In response thereto, the processing unit 60 stores, in memory 62 an image data file corresponding to the image data received.

In further reference to FIGS. 3 and 4, to capture a video sequence corresponding to the shown live representation 70 over a period of time, e.g. corresponding to the image data received from the image sensor over a period of time, the user may tap the video capture button 36b. The tap and the location of the tap is registered by the touch sensitive display 26, which transmits the information of the tap to the processing unit 60 of the video processing apparatus 20. The processing unit 60 interprets the information received and determines that the user tapped the location corresponding to the video capture button 36b. In response thereto, the processing unit 60 starts collection of image data received from the image sensor 12 and temporarily stores the data in memory 62. To stop the recording, the user may tap the video capture button 36b again. The processing unit 60 determines, based on the signal received from the touch sensitive display 26, that the user tapped the video capture button 36b and stops collecting image data received from the image sensor 12. The processing unit 60 reads the temporarily stored data from the memory 62 and creates a complete video sequence (e.g. a video data file) based thereon, which the processing unit 60 stores in the memory 62.

Figure 5A:
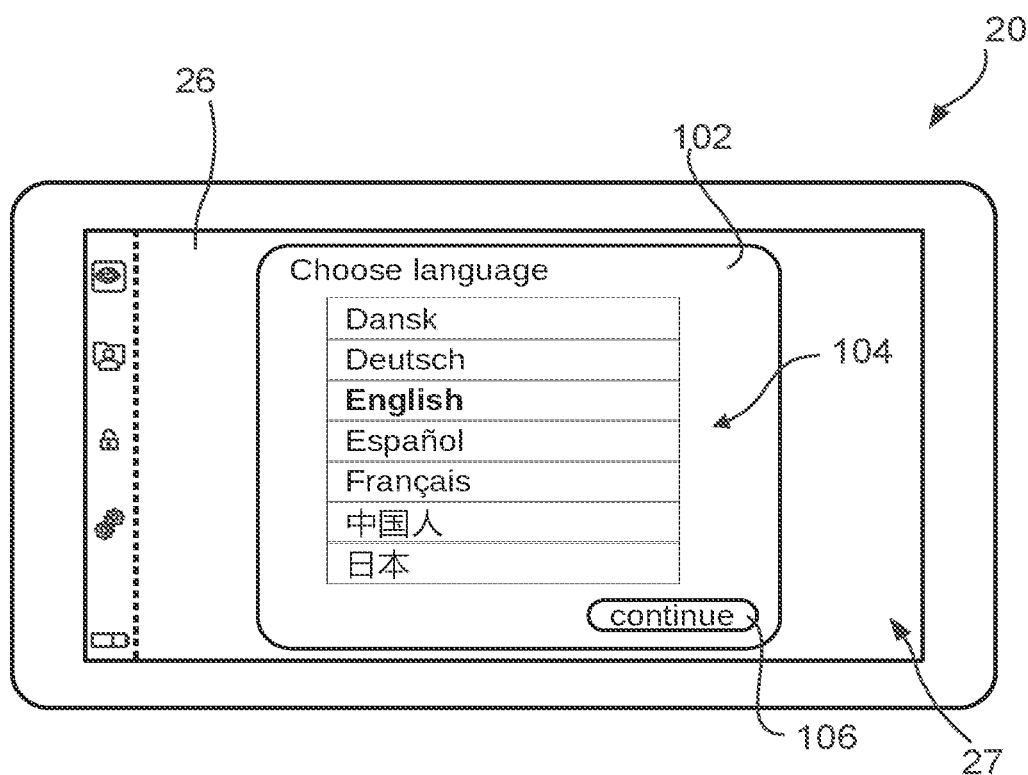
FIGS. 5A-5B schematically illustrates parts of an example graphical user interface, FIGS. 6A-6C schematically illustrates parts of an example graphical user interface, FIGS. 7A-7E schematically illustrates parts of an example graphical user interface, FIGS. 8A-8B schematically illustrates parts of an example graphical user interface, FIGS. 8C-8D schematically illustrates an example user interface on a companion device, FIGS. 8E-8G schematically illustrates parts of an example graphical user interface, and FIGS. 9A-9C schematically illustrates parts of an example graphical user interface.
Figure 5B:
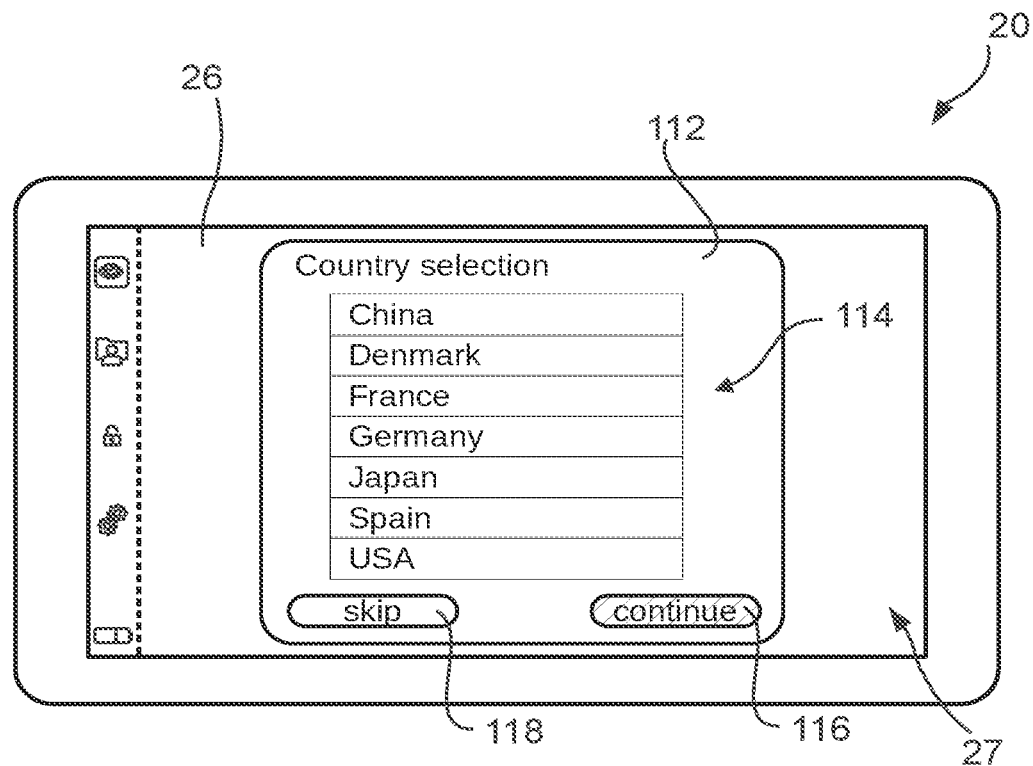

FIGS. 5A-5B schematically illustrates parts of an example graphical user interface 27 of an example video processing apparatus 20. In the illustrated example, the video processing apparatus 20 comprises a display 26, which may be a touch sensitive display, showing the graphical user interface 27.

In particular, FIG. 5A illustrates a part of the example graphical user interface 27 wherein the user is provided with an opportunity for selecting a preferred language for the video processing apparatus 20. For example, a language selection dialogue box 102 may be displayed. For example, the language selection dialogue box 102 may be provided the first time the video processing apparatus 20 is turned on, e.g. when no language has been selected. In some examples, the language selection dialogue box 102 may also be displayed if the user requests a change, e.g. in a settings menu, of the selected language. The language selection dialogue box 102 may be displayed before displaying a live representation of image data.

The language selection dialogue box 102 may comprise a plurality of language selection elements 104 respectively corresponding to a plurality of languages. The languages of each of the language selection elements 104 may be written in the respective language. The language selection elements 104 may be scrollable, in case there are more language selection elements available than shown. A user may select a language corresponding to a language selection element from the language selection elements 104, which may be indicated by changing a visual characteristic of the selected language selection element. For example, the selected language selection element may be shown in bold or in a different color etc. The user may confirm the selected language by activating a confirmation button 106, e.g. labelled "continue" or "confirm" or similar. A language, e.g. English, may be preselected, i.e. that language, e.g. English, may be selected if the user activates the confirmation button 106, without selecting a different language than the preselected one. The electronic memory 62 (see, e.g., FIG. 4) of the video processing apparatus 20 may store information of the selected language. Hence, the video processing apparatus 20, such as the processing unit 60 (see, e.g. FIG. 4), may register the selected language in the electronic memory 62 in accordance with the user's selection in the language selection dialogue box 102, in response to the user activating the confirmation button 106.

FIG. 5B illustrates a part of the example graphical user interface 27 wherein the user is provided with an opportunity for selecting the country in which the video processing apparatus 20 is to be used. For example, a country selection dialogue box 112 may be displayed. The country selection dialogue box 112 may comprise a plurality of country selection elements 114 respectively corresponding to a plurality of countries. The plurality of country selection elements 114 may be scrollable in case there are more country selection elements available than shown.

The country selection dialogue box 112 may be displayed when the video processing apparatus 20 is turned on and no acceptable country (e.g. a country in which the video processing apparatus 20 is regulatory approved) has been selected. Accordingly, the country selection dialogue box 112 may be displayed when the video processing apparatus 20 is turned on for the first time, e.g. after selecting a language, as described in relation to FIG. 5A. Accordingly, the plurality of countries of the country selection elements 114 may be written in the language as selected. The country selection dialogue box 112 may be displayed before displaying a live representation of image data.

The electronic memory 62 (see, e.g., FIG. 4) of the video processing apparatus 20 may store information of registration of an acceptable country, as well as lack of registration of an acceptable country. The country selection dialogue box 112 may be displayed on startup of the video processing apparatus 20 in accordance with the electronic memory 62 storing information of an acceptable country not being registered for the video processing apparatus.

A user may select a first country selection element, corresponding to a first country, of the country selection elements 114. The selected first country selection element may be indicated by changing a visual characteristic of the first country selection element. For example, the first country selection element may be shown in bold or in a different color etc. to indicate the selection. The user may confirm the selected country by activating a confirmation button 116, e.g. labelled "continue" or "confirm" or similar. The confirmation button 116 may be non-actionable, e.g. indicated by being grayed out, if no country is selected.

In response to detecting one or more user inputs, such as the above-described user inputs, corresponding to selection of the first country selection element, e.g. in response to the user activating the confirmation button 116 after having selected the first country selection element, the video processing apparatus 20 may store information in the electronic memory of the first country being registered for the video processing apparatus 20.

As different regulatory standards apply for devices, such as the video processing apparatus 20 in different jurisdictions, e.g. in terms of wireless communication, which may include antenna gain, transmission power, channel selection etc., or in terms of approved devices, the country in which the video processing apparatus 20 is to be used must be selected to ensure compliance with national and/or regional regulations.

In response to detecting the one or more user inputs, such as the above-described user inputs, corresponding to selection of the first country selection element, e.g. in response to the user activating the confirmation button 116 after having selected the first country selection element, the video processing apparatus 20 may adjust one or more wireless communication settings based on the first country.

The country selection dialogue box 112 may comprise a skip button 118, e.g. labeled "skip" or "later" or similar. The skip button 118 may be provided to allow the user to skip the country selection and return to the selection later. For example, in case there is an urgent need to use the video processing apparatus 20, the disclosed method provides a possibility to use the video processing apparatus 20, in such extraordinary circumstances, without having to first designate a country. Furthermore, the disclosed method also provides a possibility for a technician to test the video processing apparatus 20, e.g. checking image quality and/or other factors, without having to designate a specific country for the video processing apparatus 20. A technician may, for example, be testing the video processing apparatus 20 in production before the video processing apparatus 20 is shipped. This is of particular importance, as it is considered advantageous to limit the possibility to change the country selection after being selected once. Therefore, as the technician might not know where the specific video processing apparatus 20 is being shipped, it is advantageous that the technician may skip the country selection in order to test the functionality of the video processing apparatus 20 and may test the apparatus without having to configure and reset the video processing apparatus 20 again before it can be shipped.

Figure 6A:
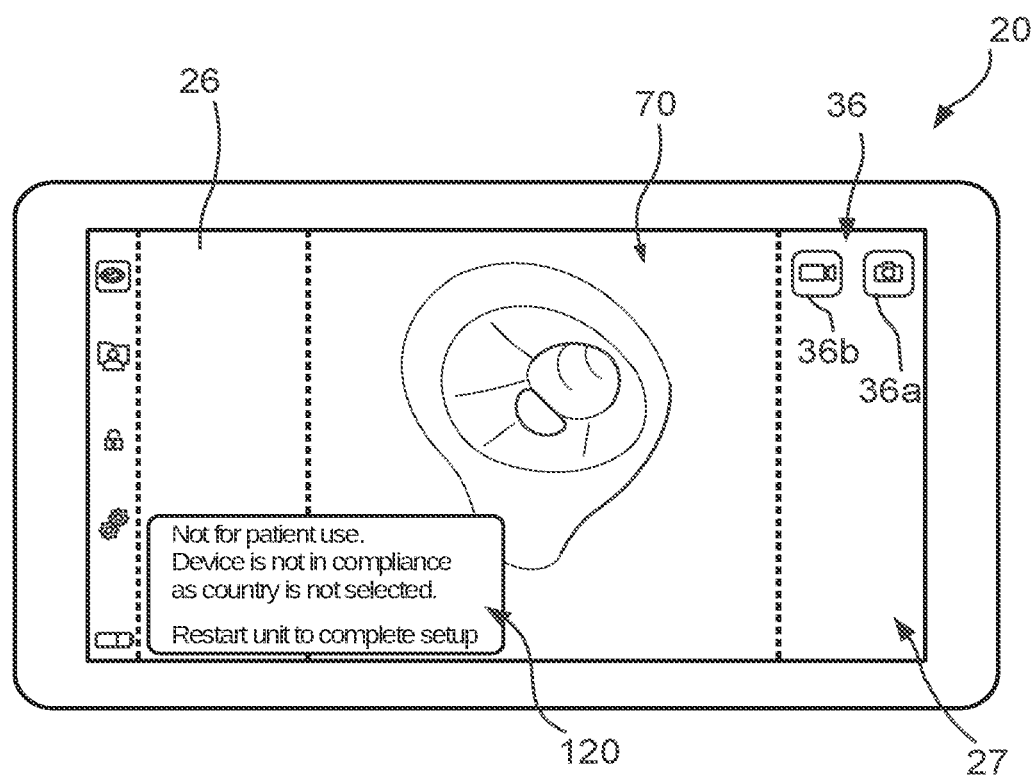
Figure 6B:
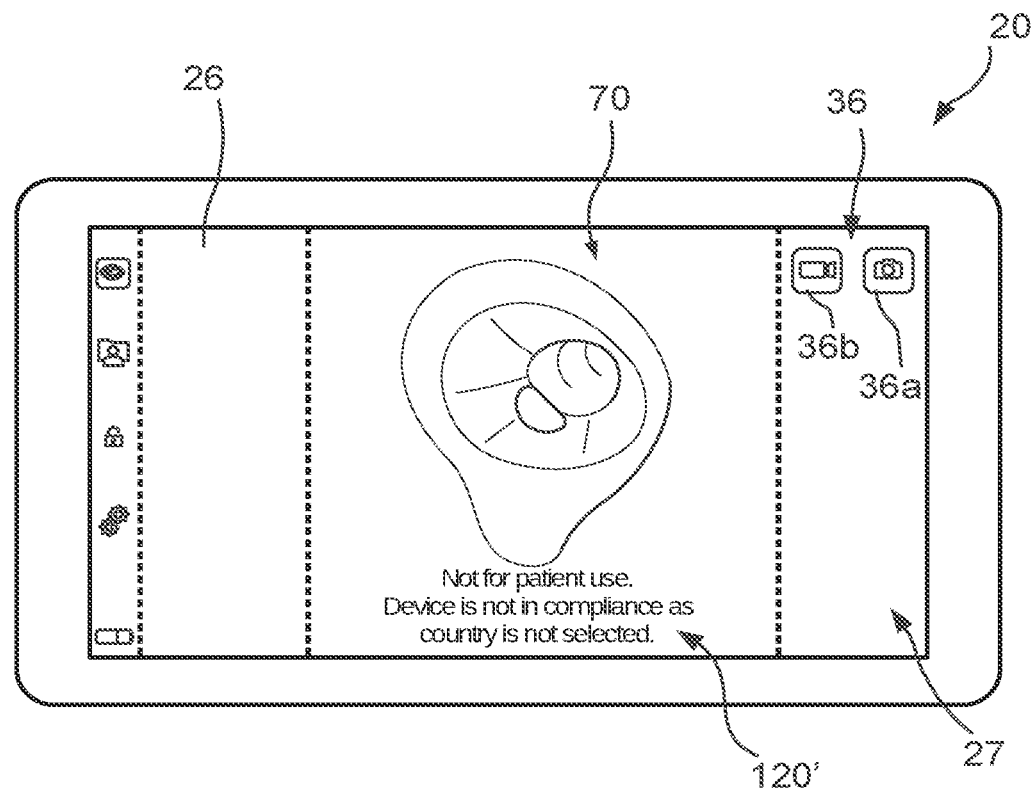
Figure 6C:
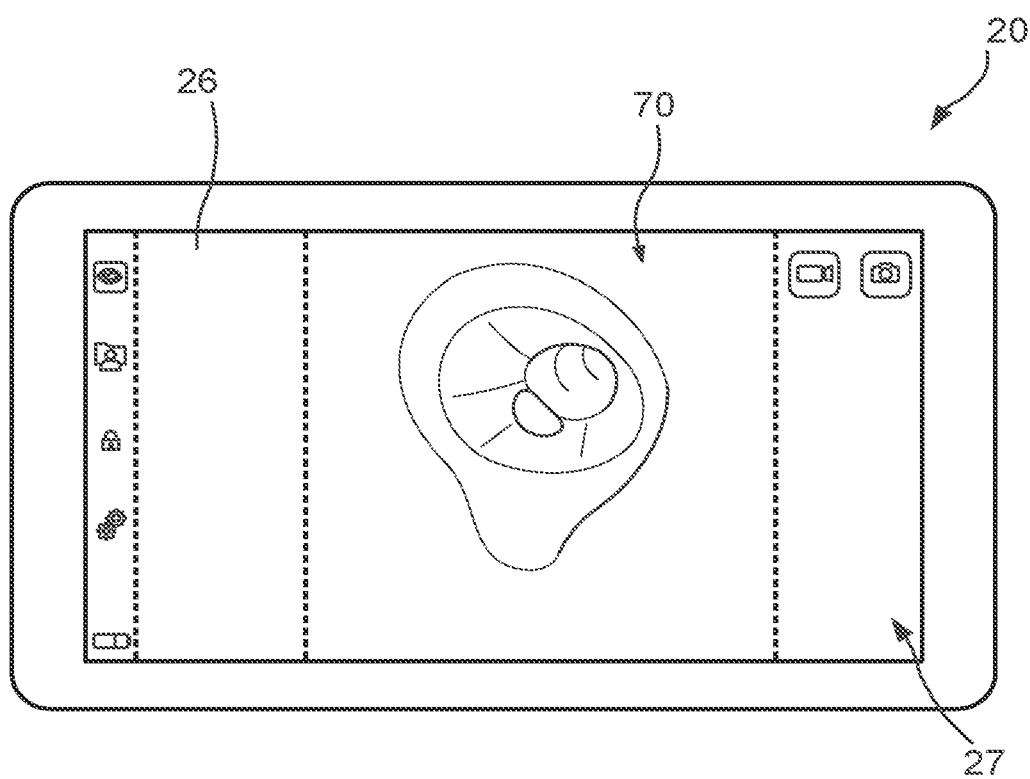

FIGS. 6A-6C schematically illustrates example parts of an example graphical user interface 27 of an example video processing apparatus 20, such as the graphical user interface 27 and video processing apparatus 20 as described in relation to FIGS. 5A-5B.

FIGS. 6A and 6B shows examples, where an acceptable country has not been properly registered and stored in the electronic memory of the video processing apparatus 20. For example, the country selection, as described in relation to FIG. 5B may have been skipped, e.g. by the user activating the skip button 118 of FIG. 5B.

As shown in FIGS. 6A and 6B, in accordance with the electronic memory storing information of an acceptable country not being registered for the video processing apparatus 20, the video processing apparatus 20 displays live representation 70 of image data, e.g. as described in relation to FIG. 3, together with displaying a message 120, 120' indicating non-compliance of the video processing apparatus due to lack of registration of an acceptable country for the video processing apparatus 20. For example, the message 120, 120' may, for example, include one or more of: "Not for patient use.", "Device is not in compliance as country is not selected", "Restart unit to complete setup", or similar. The message 120, 120' may be displayed as a message box, as exemplified in FIG. 6A, which may be sized and/or positioned to avoid and/or minimize covering of the live image 70. Alternatively, the message 120, 120' may be displayed overlaid on the live image 70, as exemplified in FIG. 6A.

As described in relation to FIGS. 3 and 4, the video processing apparatus 20 may be adapted to detect a user input corresponding to activation of an image capture function, e.g. by the user activating the image capture button 36a, and/or be adapted to detect one or more user inputs corresponding to activation and/or completion of a video capture function, e.g. by the user activating the video capture button 36b. In some examples, the image capture function and/or the video capture function may be activated by other means, such as by voice recognition, activation of a hardware button, e.g. on the visualization device, etc.

In response to detection of the user input corresponding to activation of the image capture function, the video processing apparatus 20 may store in the electronic memory an image data file corresponding to the image data received when the user input corresponding to activation of the image capture function was detected. In accordance with the electronic memory storing information of an acceptable country has not been registered for the video processing apparatus 20, as is the situation in FIGS. 6A and 6B, the image data file may include a message indicating non-compliance of the video processing apparatus due to lack of registration of an acceptable country for the video processing apparatus 20, such as the message 120' as illustrated in FIG. 6B. Alternatively or additionally, the message indicating non-compliance of the video processing apparatus due to lack of registration of an acceptable country for the video processing apparatus 20 may be saved in meta-data of the image data file. Similarly, in response to detection of the user input corresponding to activation and/or completion of the video capture function, the video processing apparatus 20 may store in the electronic memory a video data file corresponding to the image data received over a period of time in accordance with the one or more user inputs corresponding to activation and/or completion of the video capture function. In accordance with the electronic memory storing information of an acceptable country has not been registered for the video processing apparatus 20, as is the situation in FIGS. 6A and 6B, the video data file may include a message indicating non-compliance of the video processing apparatus due to lack of registration of an acceptable country for the video processing apparatus, such as the message 120' as illustrated in FIG. 6B. Alternatively or additionally, the message indicating non-compliance of the video processing apparatus due to lack of registration of an acceptable country for the video processing apparatus 20 may be saved in meta-data of the video data file.

FIG. 6C shows an example, where an acceptable country has been properly registered and stored in the electronic memory of the video processing apparatus 20. For example, the country selection, as described in relation to FIG. 5B, may have been properly completed.

As illustrated in FIG. 6C, in accordance with the electronic memory storing information of an acceptable country being registered for the video processing apparatus, the live representation 70 of the image data is displayed without displaying the message 120, 120' (cf. FIGS. 6A and 6B) indicating non-compliance of the video processing apparatus due to lack of registration of an acceptable country for the video processing apparatus. Correspondingly, image data files and/or video data files, captured and stored as described previously may be stored without a message indicating non-compliance of the video processing apparatus due to lack of registration of an acceptable country for the video processing apparatus 20.

FIG. 7A-7E schematically illustrates example parts of an example graphical user interface 27 of an example video processing apparatus 20, such as the graphical user interface 27 and video processing apparatus 20 as described in relation to FIGS. 5A-6C.

Figure 7A:
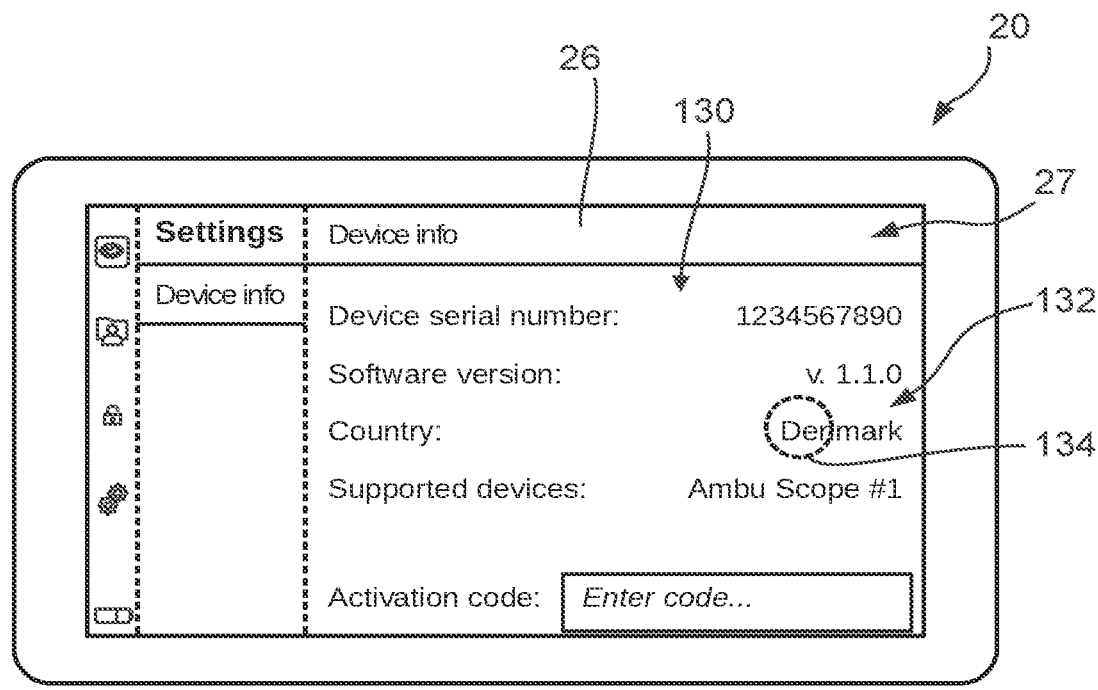
Figure 7B:
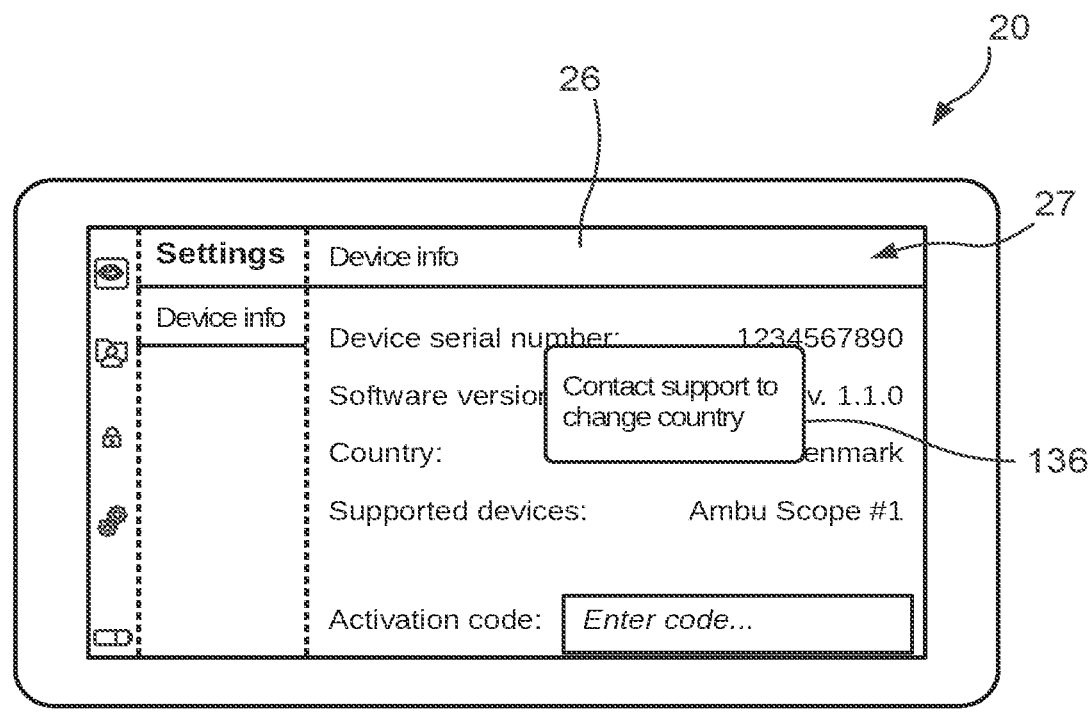

As mentioned previously, it is found to be advantageous to limit the possibility for changing the country selection for the video processing apparatus 20. In line with the present disclosure, the user needs to obtain a reset password to reset the country selection and to allow selection of a different country. FIG. 7A exemplifies a device info screen 130, wherein, among other things, the country selection 132 is shown. In the illustrated example, the user may provide a user input 134 at the country selection 132, which may bring up an information box 136, as illustrated in FIG. 7B, informing the user to contact support, e.g. the maker of the video processing apparatus, to change the country selection. In some examples, the information box 136 may include a link to a webpage or a phone number for contacting support. The user input 134 may be a touch input, such as a tap, or it may be invoked by hovering a mouse pointer.

Figure 7C:
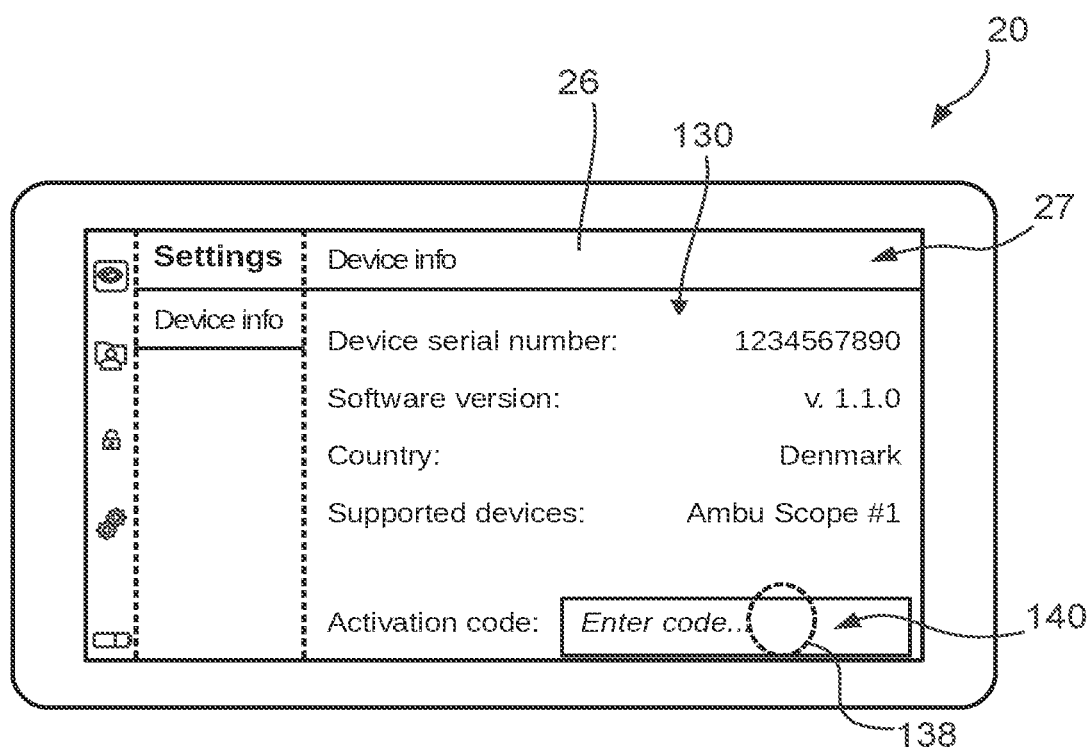
Figure 7D:
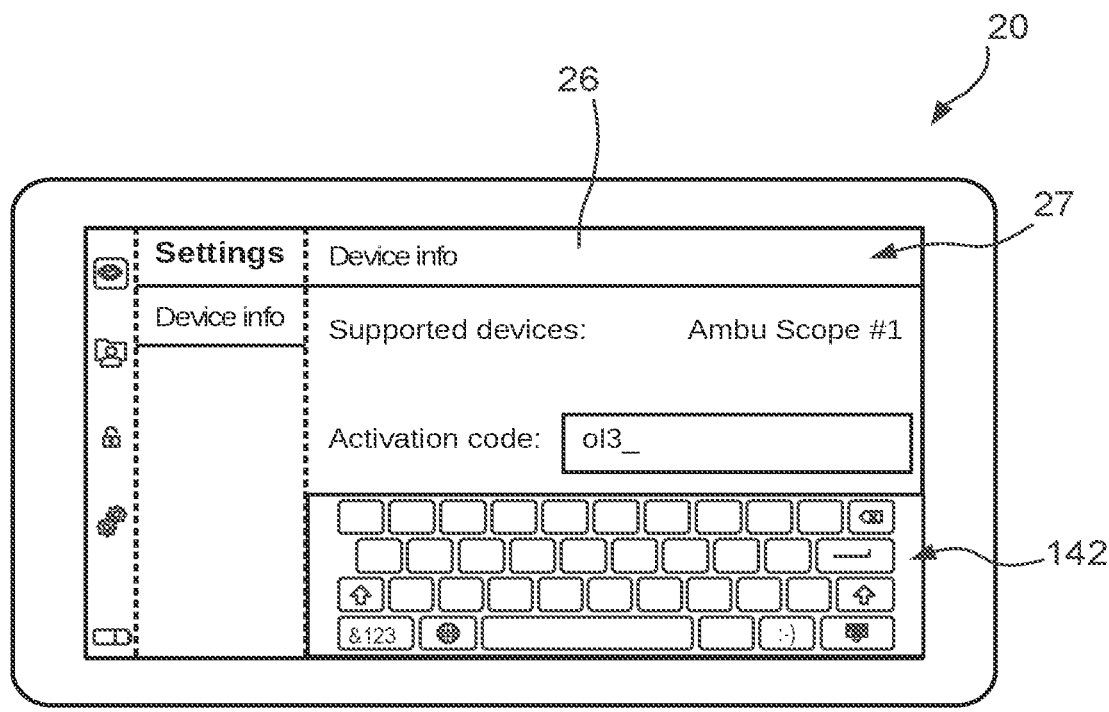
Figure 7E:
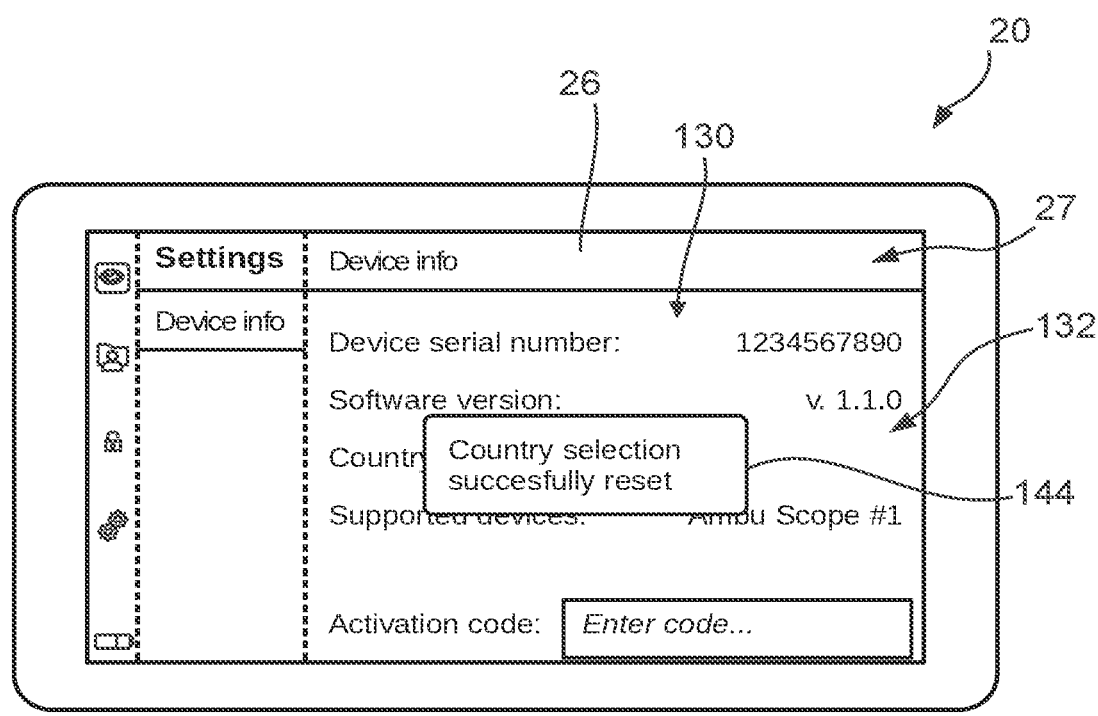

FIG. 7C illustrates the same device info screen 130 as in FIG. 7A. The user, in the example of FIG. 7C, provides a user input 138 at a code entry field 140, which may bring up a virtual keyboard 142, as illustrated in FIG. 7D, for the user to provide a password input corresponding to a reset password, e.g. as obtained from support. In cases where an external keyboard is coupled to the video processing apparatus 20, the virtual keyboard 142 may be omitted and the user input 138 at the code entry field 140 may merely activate an input function of the code entry field 140 for the user to provide the password input by means of the external keyboard. After entering the reset password in the code entry field 140, the user may confirm the entered reset password by hitting the return button on the keyboard (e.g. the virtual keyboard 142 or the external keyboard). The video processing apparatus 20 compares the entered reset password, as provided by the password input, to an internal reset password. In accordance with a determination that the password input corresponds to the internal reset password, the video processing apparatus 20 deletes the information in the electronic memory of the country being registered for the video processing apparatus 20. Optionally, the video processing apparatus 20 may cause the display to display a confirmation box 144, as illustrated in FIG. 7E. The confirmation box 144 may include a text indicating to the user that the country selection has been reset. The confirmation box 144 may also include a text informing the user that the video processing apparatus 20 should be restarted to select a country.

The internal reset password may be based on the present date and/or time. Thereby, the reset password needed to reset the country selection may work only for a limited duration of time, e.g. to limit the user's ability to change the country again and again. The internal reset password may be based on a serial number of the video processing apparatus 20. Thereby, the reset password needed to reset the country selection may work only for the specific video processing apparatus 20. The internal reset password may also be based on a non-public password variable. Thereby, only the support having knowledge of the non-public password variable is able to generate a reset password in accordance with the internal reset password of the video processing apparatus 20.

After successfully deleting the information in the electronic memory of a country being registered for the video processing apparatus 20, upon restart of the video processing apparatus 20, the user is again provided with the country selection dialogue box 112 of FIG. 5B. In some examples, after successfully deleting the information in the electronic memory of a country being registered for the video processing apparatus 20, language selection information is also reset, and upon restart of the video processing apparatus 20, the user is also asked to select language as in FIG. 5A.

FIGS. 8A-8B and 8E-8G schematically illustrates example parts of an example graphical user interface 27 of an example video processing apparatus 20, such as the graphical user interface 27 and video processing apparatus 20 as described in relation to FIGS. 5A-7E. FIGS. 8C-8D schematically illustrates an example user interface on a companion device 80, such as a smart phone, a tablet, or a PC.

Figure 8A:
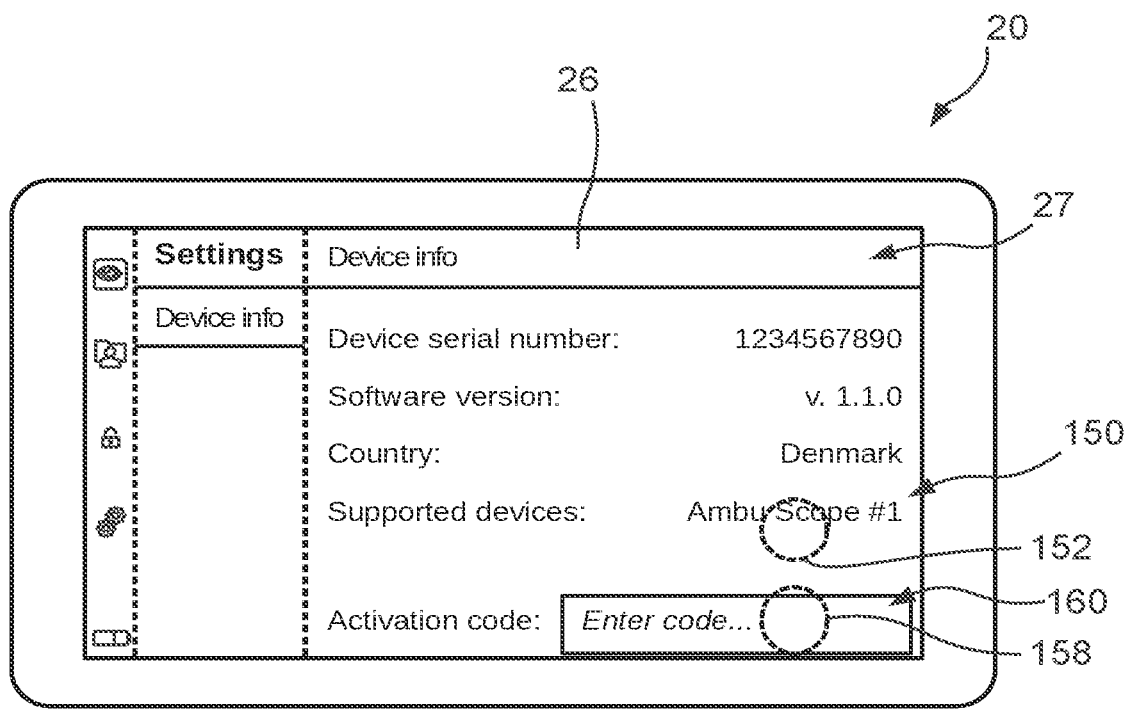

FIG. 8A exemplifies a device info screen 130, such as the device info screen 130 as also shown in FIG. 7A. The device info screen 130 shows a list of supported devices 150. The list of supported devices 150 shows the different visualization devices supported by the video processing apparatus 20. In the shown example, the video processing apparatus 20 only supports a single device, and accordingly, the list only comprises one supported device, labelled "Ambu Scope #1".

The video processing apparatus 20, e.g. the electronic memory of the video processing apparatus 20, may store device data enabling compatibility of the video processing apparatus 20 with one or more of a plurality of medical visualization devices. The device data may include first device data enabling compatibility with a first medical visualization device (e.g. the first medical visualization device 4 in FIG. 1) and the device data may include second device data enabling compatibility with a second medical visualization device (e.g. the second medical visualization device 4' in FIG. 1). However, regulatory approval as well as other jurisdictional differences may mean that the video processing apparatus can support some devices in some jurisdictions, e.g. in some countries, while supporting others or fewer devices in other jurisdictions, e.g. in other countries. Hence, the video processing apparatus 20, in accordance with the present disclosure may be adapted such that the list of supported devices differs between countries. Furthermore, e.g. regulatory approval in one or more countries may be achieved after shipping the video processing apparatus 20 to the customer, and therefore it may be advantageous to be able to activate non-supported visualization devices, for which the video processing apparatus 20 in fact stores device data enabling compatibility. Therefore, in accordance with the present disclosure, the video processing apparatus 20, such as the electronic memory, stores activation data for the device data. For example, the video processing apparatus 20, such as the electronic memory of the video processing apparatus 20, may store activation data including first activation data corresponding to the first device data and second activation data corresponding to the second device data. The list of supported devices 150 may show visualization devices for which respective activation data is indicative of respective device data being activated. The list of supported devices 150 may omit visualization devices for which respective activation data is indicative of respective device data being deactivated.

In such situations, since the video processing apparatus 20 in fact stores appropriate device data enabling compatibility with a certain visualization device, although not being approved for use and therefore not appearing on the list of supported devices 150, the video processing apparatus 20 would still be able to work with such visualization device. For example, while video processing apparatus 20, as exemplified only supports "Ambu Scope #1" coupling a visualization device of the type "Ambu Scope #2", might perfectly work with the video processing apparatus 20, since the video processing apparatus 20 has the necessary device data enabling compatibility of the video processing apparatus 20 with the Ambu Scope #2. However, such use of the Ambu Scope #2 with the video processing apparatus 20 would not comply with regulatory requirements. On the other hand, in some cases, e.g. in an emergency situation, or for testing purposes, it may be advantageous to let the non-supported visualization device, e.g. the Ambu Scope #2 in the example, practically work with the video processing apparatus 20 regardless of incompliance with regulatory requirements.

Figure 9A:
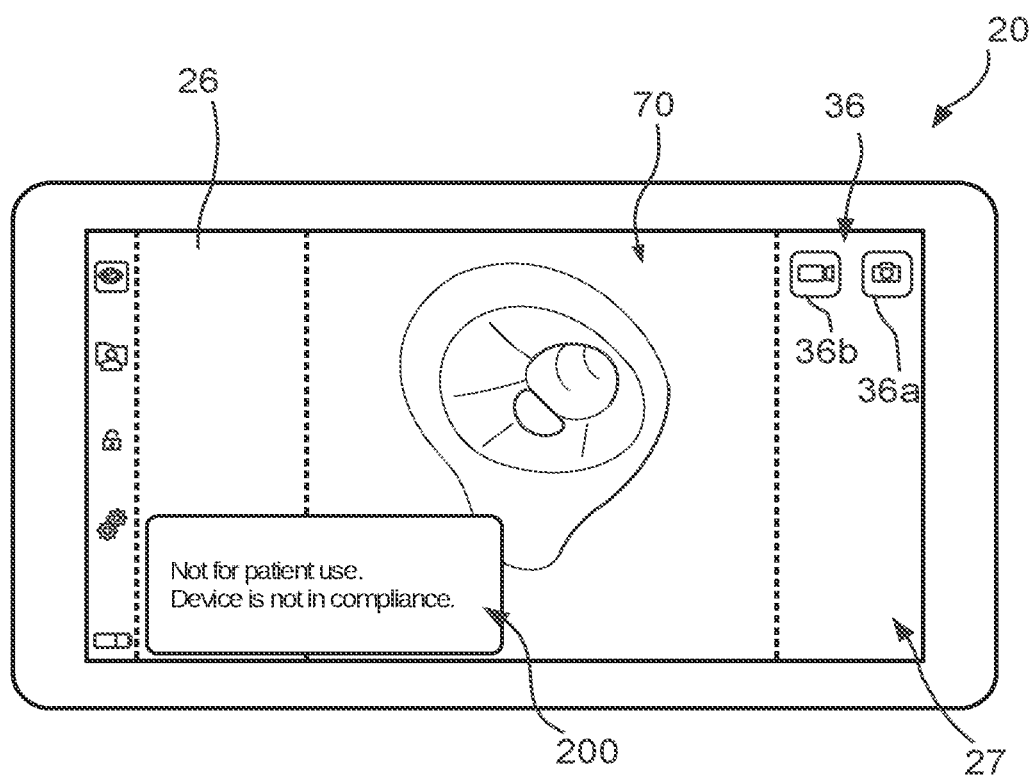
Figure 9B:
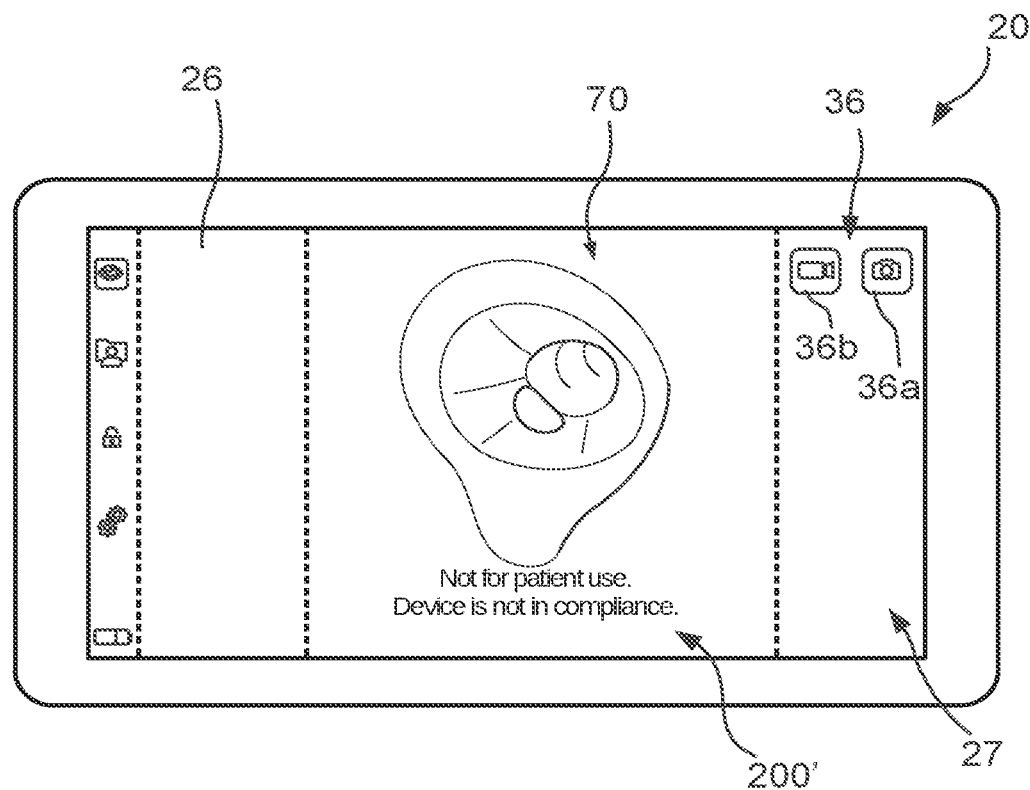

Therefore, the present disclosure provides that the video processing apparatus 20, while receiving the image data from a coupled medical visualization device, in accordance with activation data being indicative of the device data corresponding to the coupled medical visualization device, e.g. being of the type "Ambu Scope 2", being deactivated, the live representation 70 of the image data is displayed together with displaying a message 200, 200' indicating non-compliance of the coupled medical visualization device (cf. FIGS. 9A and 9B). In accordance with the activation data being indicative of the device data corresponding to the coupled medical visualization device, e.g. being of the type "Ambu Scope 1" being activated, the live representation 70 of the image data is displayed without displaying the message 200, 200' indicating non-compliance of the coupled medical visualization device (cf. FIG. 9C).

In a situation where country selection, as described in relation to FIG. 5B has been omitted, i.e. the electronic memory stores information of an acceptable country not being registered for the video processing apparatus 20, and a medical visualization device is coupled, which is deactivated, both the message 120, 120' (cf. FIGS. 6A and 6B), indicating non-compliance of the video processing apparatus due to lack of registration of an acceptable country for the video processing apparatus 20, and the message 200, 200' indicating non-compliance of the coupled medical visualization device (cf. FIGS. 9A and 9B), may be displayed.

As mentioned previously, the present disclosure provides for the video processing apparatus 20 storing device data enabling compatibility of the video processing apparatus 20 with one or more medical visualization devices in addition to the currently activated medical visualization devices (in accordance with corresponding activation data) shown in the list of supported devices 150. The present disclosure further provides for activation of such not yet activated medical visualization devices, as will be described in the following.

Figure 8B:
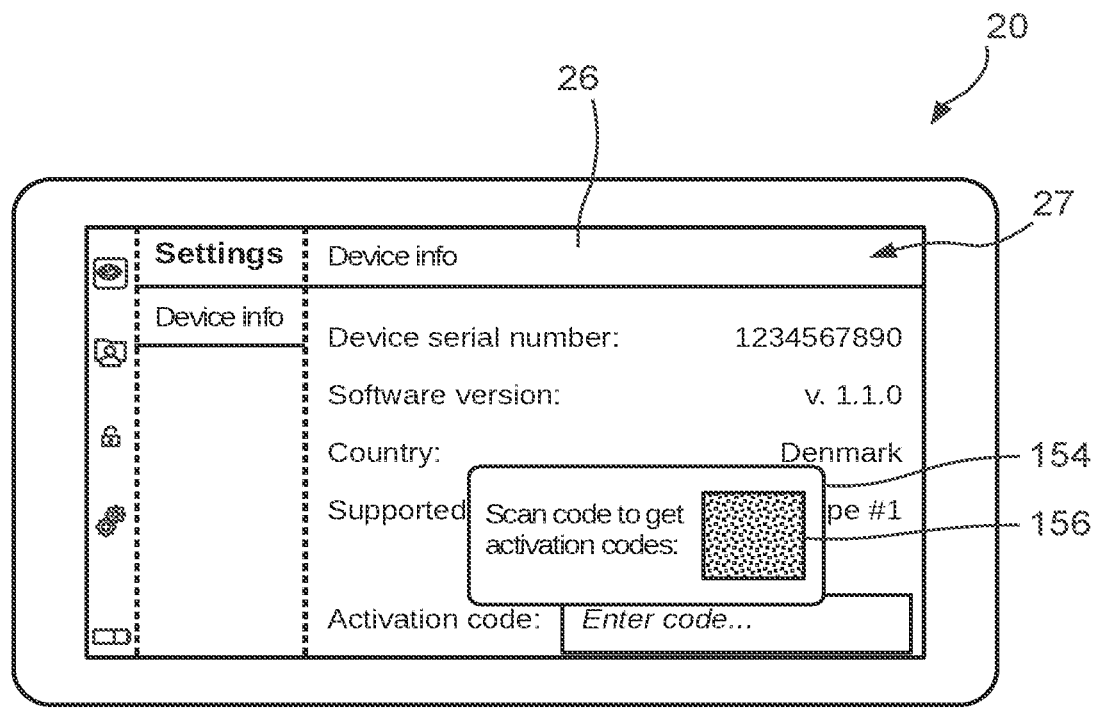
Figure 8C:
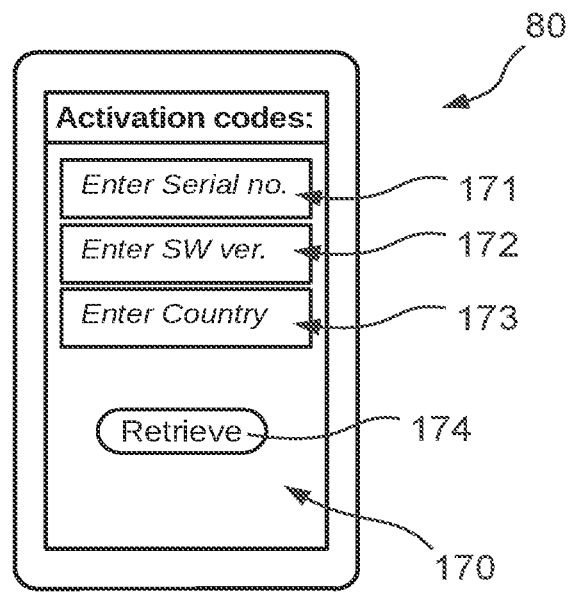
Figure 8D:
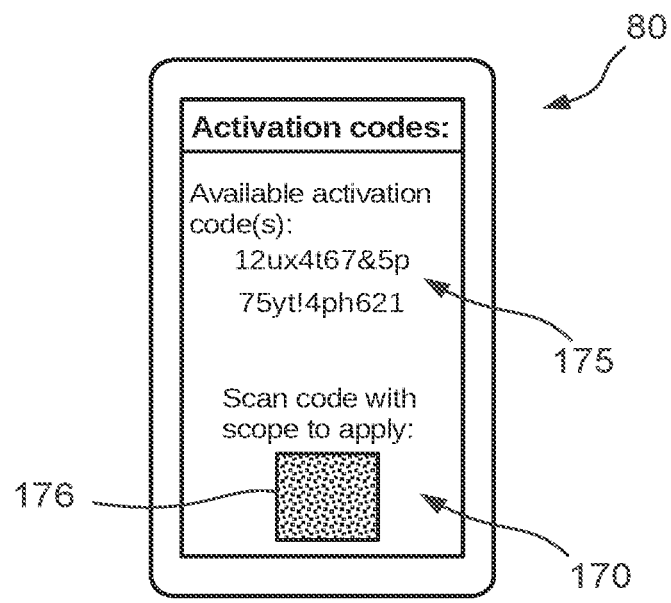

As illustrated in FIG. 8A, the user may provide a user input 152, e.g. at the list of supported devices 150 or at the code entry field 160, which may bring up an information box 154, as illustrated in FIG. 8B, informing the user how to obtain activation codes to add support for other devices. For example, the user input 152 may be a touch input, such as a tap, or it may be invoked by hovering a mouse pointer. In some examples, the information box 154 may include a link to a webpage or a phone number for contacting a relevant support body. The information box 154 may include a retrieval code 156 to be provided to a companion device, such as a smart phone, e.g. by use of a camera of the companion device. The retrieval code 156 may be in the form of an optically readable code, e.g. a bar code or a QR code. Alternatively, the retrieval code 156 may be in the form of a string of characters. The retrieval code 156 may prompt the companion device to contact an online resource to retrieve the activation code.

FIG. 8C schematically illustrates a companion device 80, such as a smart phone, for retrieval of the activation code. The companion device 80 may present an example activation code retrieval user interface 170, e.g. as retrieved from the online resource, after reading the retrieval code 156 of FIG. 8B. Alternatively, the companion device 80 may present the shown information in response to the user manually having entered a retrieval code in the form of a string of characters and/or having entered a link to a webpage in accordance with information in the information box 154. The activation code retrieval user interface 170 may, as illustrated, include one or more entry fields 171, 172, 173. For example, the activation code retrieval user interface 170 may include a serial number entry field 171, a software version entry field 172, and a country entry field 173. In some examples, the activation code retrieval user interface 170 may alternatively or additionally include an entry field for specifying the type and/or model of the video processing unit, e.g. a model no. or similar. This may, for example, be provided as a drop-down selection field. The activation code retrieval user interface 170 may comprise a confirmation button 174, which may be labeled "Retrieve", "Confirm", "OK" or similar. In some examples, the confirmation button 174 may be omitted, and an automatic confirmation may be inferred when all fields have been successfully filled in. The activation code needed to activate additional visualization devices for the video processing apparatus 20 may be specific for the serial number of the video processing apparatus, for the type/model of video processing apparatus, for the software version of the video processing apparatus, and/or for the country for which the video processing apparatus 20 is registered. Furthermore, as explained previously, different visualization devices may be approved for use in different jurisdictions. Therefore, the user may be needed to enter information of the serial number, the software version, and the country of the video processing apparatus 20, in their respective entry fields 171,172 173. After having done so, the user may press the confirmation button 174, which may result in the retrieval user interface 170 providing available activation code(s) 175, as illustrated in FIG. 8D. As illustrated, there may be more than one available activation code 175, which may be due to more than one visualization device being activatable. In some examples, one activation code may activate a plurality of visualization devices.

In some examples, the retrieval code 156 as illustrated and described in relation to FIG. 8A may include embedded information of the serial number, the type/model of the video processing apparatus, the software version and/or the country of the video processing apparatus 20. Thus, the retrieval code 156 may be based on information of the country being registered for the video processing apparatus, the serial number and/or the software version. Accordingly, the companion device 80, e.g. in response to the retrieval code 156 being provided to the companion device 80, may parse the information of the country, the software version, and/or the serial number to the online resource. Thereby, the companion device 80 may, directly in response to receiving the retrieval code 156 receive the screen of the retrieval user interface 170 as illustrated in FIG. 8D providing the available activation code(s). Thereby skipping the need for the user to manually typing the necessary information, such as the serial number, the software version, and the country of the video processing apparatus 20.

Figure 8E:
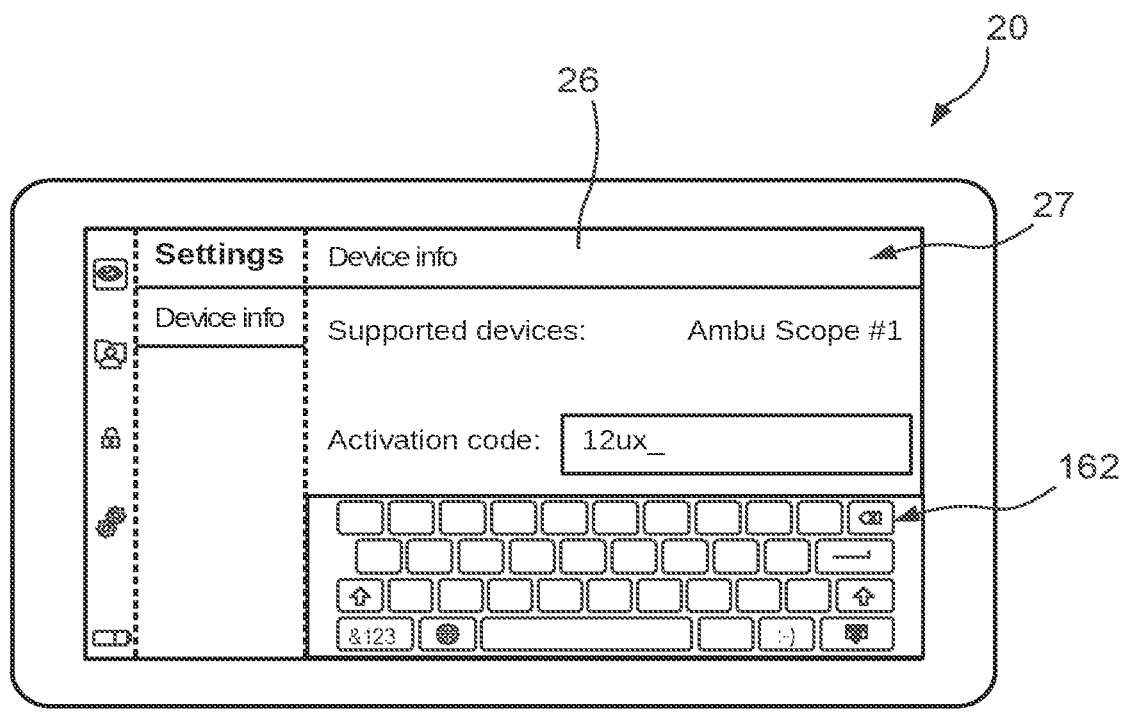

Turning back to FIG. 8A, the user may (e.g. after having retrieved one or more activation codes, as described in relation to FIGS. 8C and 8D) provide a user input 158 at a code entry field 160, which may bring up a virtual keyboard 162, as illustrated in FIG. 8E, for the user to provide a retrieved activation code, e.g. as obtained from retrieval user interface 170 of FIGS. 8A and 8D. It is noted, as also illustrated, that the code entry field 160 may be the same code entry field 140 as described in relation to FIGS. 7A-7E for providing a reset password for resetting country selection. In cases where an external keyboard is coupled to the video processing apparatus 20, the virtual keyboard 162 may be omitted and the user input 158 at the code entry field 160 may merely activate an input function of the code entry field 160 for the user to provide the activation code by means of the external keyboard.

After entering the activation code in the code entry field 160, the user may confirm the entered activation code by hitting the return button on the keyboard (e.g. the virtual keyboard 162 or the external keyboard) and/or a designated confirm button.

Figure 8F:
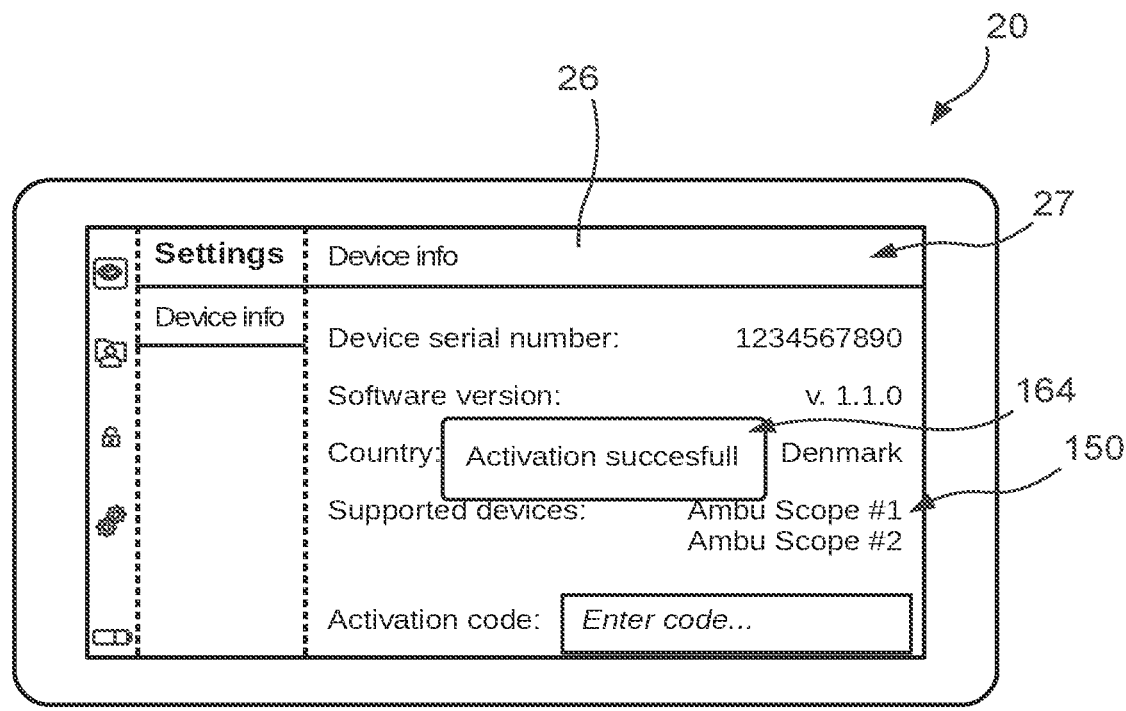

In response to receiving the activation code input corresponding to the activation code entered in the code entry field 160, the video processing apparatus 20 determines whether the activation code input corresponds to an internal activation code for device data of additional visualization devices stored in the electronic memory of the video processing apparatus 20. In accordance with a determination that the activation code input corresponds to an internal activation code for additional device data, the video processing apparatus alters the corresponding activation data for the additional device data to be indicative of the additional device data being activated. For example, in accordance with a determination that the activation code input corresponds to an internal activation code for first device data, the video processing apparatus alters first activation data for the first device data to be indicative of the first device data being activated. Similarly, in accordance with a determination that the activation code input corresponds to an internal activation code for second device data, the video processing apparatus alters second activation data for the second device data to be indicative of the second device data being activated. Optionally, the video processing apparatus 20 may cause the display to display a confirmation box 164, as illustrated in FIG. 8F, indicating that the activation code input was determined to correspond to an internal activation code and that additional device data have been activated. The confirmation box 164 may include a text indicating to the user that activation of one or more additional visualization devices has been successful. Furthermore, the list of supported devices 150 may be updated to include the newly activated device(s), e.g. "Ambu Scope #2" as illustrated. In some examples, the newly activated device(s) may appear in the list of supported devices 150 in a color (e.g. green) different than the previously activated devices, such as to visually indicate the newly activated device(s).

In accordance with a determination that the activation code input does not correspond to an internal activation code for additional device data, the video processing apparatus does not alter activation data. Optionally, the video processing apparatus 20 may cause the display to display the confirmation box 164, as illustrated in FIG. 8F, although altered to indicate that the activation code input was determined not to correspond to an internal activation code and that additional device data have not been activated.

Figure 8G:
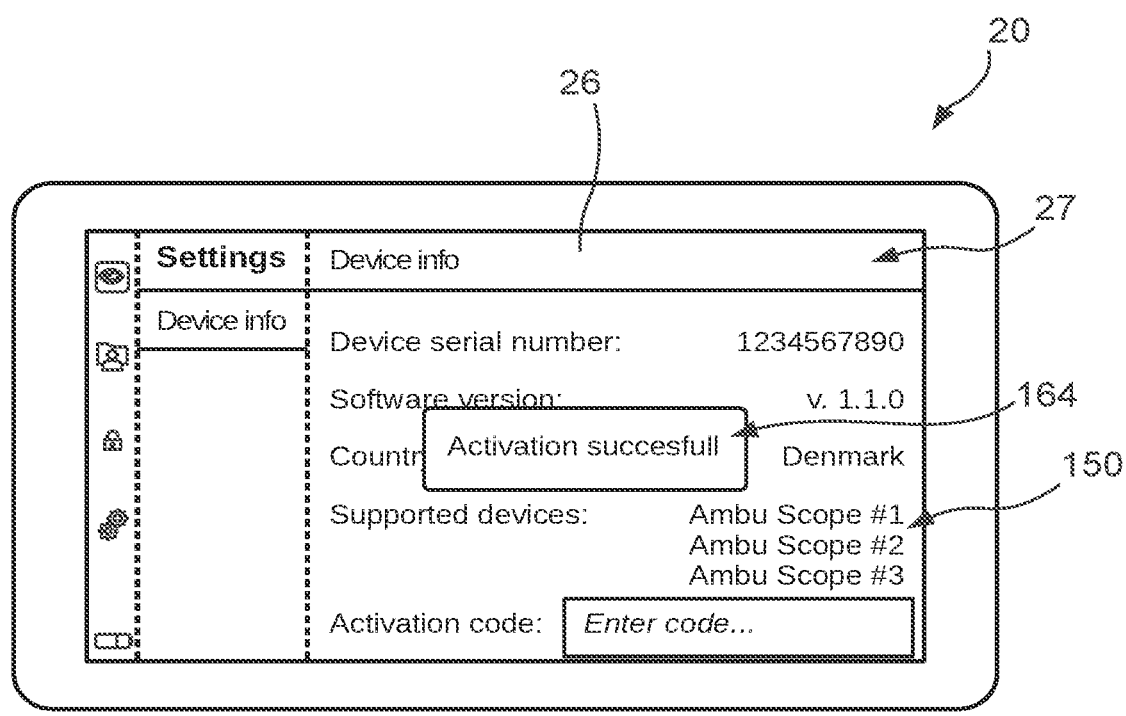

The user may repeat the same procedure to enter another available activation code, such as the second available activation code of the list of available activation codes 175 retrieved, as illustrated in FIG. 8D, which may similarly result in the video processing apparatus 20 displaying the confirmation box 164, as illustrated in FIG. 8G, as well as updating the list of supported devices 150 to include the further newly activated device(s), e.g. "Ambu Scope #3" as illustrated.

As mentioned previously, the activation code needed to activate additional visualization devices for the video processing apparatus 20 may be specific for the serial number of the video processing apparatus, for the software version of the video processing apparatus, and/or for the country for which the video processing apparatus 20 is registered. The activation code may further be specific for the additional visualization device. Therefore, the internal activation code may be based on the information indicative of the country being registered for the video processing apparatus 20, the software version of the video processing apparatus, and/or the serial number of the video processing apparatus. The internal activation code may also be specific for the additional visualization device. Hence, in case the video processing apparatus 20, such as the electronic memory of the video processing apparatus 20, stores a plurality of device data respectively enabling compatibility with a plurality of medical visualization devices, for which corresponding activation data is indicative of the device data being deactivated, the video processing apparatus may comprise and/or generate a plurality of internal activation codes, e.g. one for each of the deactivated device data. Hence, each device data enabling compatibility with a medical visualization device, may be activated independently. Accordingly, it may be a prerequisite that an acceptable country has been registered, i.e. if the user has not registered an acceptable country for the video processing apparatus 20, as in the situation of FIGS. 6A and 6B, it may not be possible to activate additional device data. Thus, the video processing apparatus 20 may be adapted to receive the activation code input only if the electronic memory stores information of an acceptable country being registered for the video processing apparatus. Correspondingly, in accordance with the electronic memory storing information of an acceptable country not being registered for the video processing apparatus 20, the video processing apparatus 20 may be adapted not to receive the activation code input. For example, the code entry field 160 as shown in FIG. 8A may be grayed out or not shown if the electronic memory stores information of an acceptable country not being registered for the video processing apparatus 20.

The video processing apparatus 20, such as the electronic memory of the video processing apparatus 20, may store an algorithm, which is only known by the maker of the video processing apparatus, for generating the internal activation code(s) based on the mentioned parameters. Hence, for example, changing the country for which the video processing apparatus 20 is registered may lead to the internal activation code(s) being different, which in effect provides that the maker of the video processing apparatus, knowing the algorithm for generating the corresponding activation code, can release activation codes for activation of certain additional devices, which only works for activation of those devices in video processing apparatus 20 in applicable countries.

Furthermore, as explained previously, different visualization devices may be approved for use in different jurisdictions. Therefore, the user may be needed to enter information of the serial number, the software version, and the country of the video processing apparatus 20, in their respective entry fields 171,172 173. After having done so, the user may press the confirmation button 174, which may result in the retrieval user interface 170 providing available activation code(s) 175, as illustrated in FIG. 8D. As illustrated, there may be more than one available activation code 175, which may be due to more than one visualization device being activatable.

Returning to FIG. 8D, the activation code retrieval user interface 170 may, e.g. together with the available activation code(s) 175, include an optical code 176. The optical code may be a QR code, a bar code, or similar code readable by use of an image sensor or another vision detection sensor. The optical code 176 may include embedded information of the available activation code(s) 175. The user may thereby provide the activation code(s) 175 by scanning the optical code 176 with the video processing apparatus 20. Thereby, the activation code input corresponding to one or more activation codes may be entered merely be scanning of the optical code 176. Hence, manual provision of the activation code(s) in the code entry field 160 (FIG. 8A) may be omitted, and a plurality of activation codes may potentially be entered simultaneously by merely scanning the optical code 176.

In some examples, the video processing apparatus 20 may comprise an optical scanner 69 (cf. FIG. 4), which may be adapted to scan the optical code 176. Alternatively or additionally, a visualization device with an image sensor (such as the visualization devices 4, 4' of FIG. 1) from which the video processing apparatus 20 is receiving image data may be used to scan the optical code 176 with the video processing apparatus 20. Thus, receiving the activation code input by the video processing apparatus 20 may include scanning the optical code 176 with the optical scanner 69 and/or a medical visualization device connected to the video processing apparatus. The video processing apparatus 20, e.g. the optical scanner 69 and/or the processing unit of the video processing apparatus 20, may identify the activation code in the optical code 176. Thus, in response to the user scanning the optical code 176 as displayed by the companion device 80 in FIG. 8D, the video processing apparatus identifies the activation code(s) 175 in the image data from the medical visualization device or by the optical scanner.

The internal evaluation at the video processing apparatus 20 of the received activation code input may be performed similarly as described with respect to the manual entering of the activation codes (FIG. 8E). In response to receiving the activation code input, the video processing apparatus 20 determines whether the activation code input corresponds to one or more internal activation codes for device data of additional visualization devices stored in the electronic memory of the video processing apparatus 20. In accordance with a determination that the activation code input corresponds to one or more internal activation codes for additional device data, the video processing apparatus 20 alters the corresponding activation data for the additional device data to be indicative of the additional device data being activated. Optionally, the video processing apparatus 20 may cause the display to display a confirmation box 164, as illustrated in FIGS. 8F and 8G, indicating that the activation code input was determined to correspond to one or more internal activation codes and that additional device data have been activated. The confirmation box 164 may include a text indicating to the user that activation of one or more additional visualization devices has been successful. Furthermore, the list of supported devices 150 may be updated to include the newly activated device(s), e.g. "Ambu Scope #2" and/or "Ambu Scope #3" as illustrated.

FIGS. 9A and 9B, as also briefly described above with respect to FIG. 8A, schematically illustrates examples where the coupled medical visualization device, in accordance with activation data being indicative of the device data corresponding to the coupled medical visualization device is deactivated, the live representation 70 of the image data is displayed together with displaying a message 200, 200' indicating non-compliance of the first medical visualization device. Correspondingly, FIG. 9C, as also briefly described above with respect to FIG. 8A, schematically illustrates an example where the coupled medical visualization device, in accordance with activation data being indicative of the device data corresponding to the coupled medical visualization device is activated, the live representation 70 of the image data is displayed without displaying a message indicating non-compliance of the first medical visualization device.

In response to detection of the user input corresponding to activation of the image capture function, e.g. by the user activating the image capture button 36a, the video processing apparatus 20 may store, in the electronic memory, an image data file corresponding to the image data received when the user input corresponding to activation of the image capture function was detected. In accordance with the activation data being indicative of device data for the coupled medical visualization device being deactivated, as is the situation in FIGS. 9A and 9B, the image data file may include a message indicating non-compliance of the video processing apparatus 20 and/or the coupled medical visualization device, such as the message 200' as illustrated in FIG. 9B. Alternatively or additionally, the message indicating non-compliance of the video processing apparatus 20 and/or the coupled medical visualization device may be saved in meta-data of the image data file.

Similarly, in response to detection of one or more user inputs corresponding to activation and/or completion of the video capture function, e.g. by the user activating the video capture button 36b, the video processing apparatus 20 may store, in the electronic memory, a video data file corresponding to the image data received over a period of time in accordance with the one or more user inputs corresponding to activation and/or completion of the video capture function. In accordance with the activation data being indicative of device data for the coupled medical visualization device being deactivated, as is the situation in FIGS. 9A and 9B, the video data file may include a message indicating non-compliance of the video processing apparatus 20 and/or the coupled medical visualization device, such as the message 200' as illustrated in FIG. 9B. Alternatively or additionally, the message indicating non-compliance of the video processing apparatus 20 and/or the coupled medical visualization device may be saved in meta-data of the video data file.

Figure 9C:
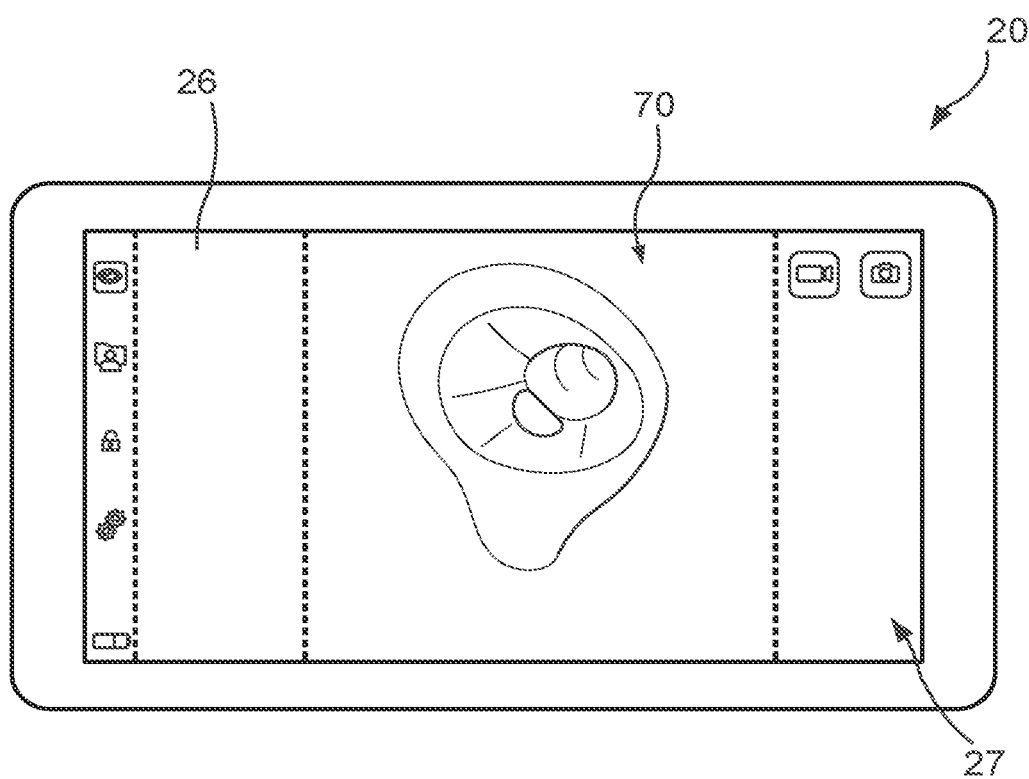

As illustrated in FIG. 9C, in accordance with the activation data being indicative of device data for the coupled medical visualization device being activated, the live representation 70 of the image data is displayed without displaying a message indicating non-compliance of the video processing apparatus 20 and/or the coupled medical visualization device, such as the messages 200, 200' as illustrated in FIGS. 9A and 9B. Correspondingly, image data files and/or video data files, captured and stored as described previously may be stored without a message indicating non-compliance of the video processing apparatus 20 and/or the coupled medical visualization device, in accordance with the activation data being indicative of device data for the coupled medical visualization device being activated.

The following items are further variations and examples of the embodiments described with reference to the FIGURES.

1. A video processing apparatus operable to receive image data from one or more medical visualization devices, the video processing apparatus comprising: a housing, a processing unit adapted to receive the image data from the one or more medical visualization devices and cause a display to display a live representation of the image data, electronic memory, wherein the processing unit is connected to the electronic memory and adapted to read and write data from and to the electronic memory, wherein the video processing apparatus displays with the display a graphical user interface, and the video processing apparatus: in accordance with the electronic memory storing information of an acceptable country not being registered for the video processing apparatus, displays the live representation of the image data together with displaying a message indicating non-compliance of the video processing apparatus due to lack of registration of an acceptable country for the video processing apparatus, and in accordance with the electronic memory storing information of an acceptable country being registered for the video processing apparatus, displays the live representation of the image data without displaying the message indicating non-compliance of the video processing apparatus due to lack of registration of an acceptable country for the video processing apparatus.

2. Video processing apparatus according to item 1, wherein the video processing apparatus, after being turned on and before displaying the live representation of the image data, in accordance with the electronic memory storing information of an acceptable country not being registered for the video processing apparatus, displays a country selection dialogue box comprising a plurality of country selection elements respectively corresponding to a plurality of countries, and wherein the video processing apparatus is adapted to detect one or more user inputs corresponding to selection of a first country selection element of the plurality of country selection elements, wherein the first country selection element corresponds to a first country of the plurality of countries, and, in response to detecting the one or more user inputs corresponding to selection of the first country selection element, storing information in the electronic memory of the first country being registered for the video processing apparatus.

3. Video processing apparatus according to any of the preceding items, wherein the video processing apparatus is adapted to receive a password input corresponding to a reset password, and, in accordance with a determination that the password input corresponds to an internal reset password, the video processing apparatus deletes the information in the electronic memory of an acceptable country being registered for the video processing apparatus, wherein the internal reset password is based on a serial number of the video processing apparatus, and a present date.

4. Video processing apparatus according to any of the preceding items, wherein the video processing apparatus is adapted to detect a user input corresponding to activation of an image capture function, and, in response to detection of the user input corresponding to activation of the image capture function, the video processing apparatus stores in the electronic memory an image data file corresponding to the image data received when the user input corresponding to activation of the image capture function was detected.

5. Video processing apparatus according to item 4, wherein in accordance with the electronic memory storing information of an acceptable country not being registered for the video processing apparatus, the image data file includes a message indicating non-compliance of the video processing apparatus due to lack of registration of an acceptable country for the video processing apparatus.

6. Video processing apparatus according to any of the preceding items, wherein the one or more medical visualization devices is a plurality of medical visualization devices including a first medical visualization device and a second medical visualization device, wherein the first medical visualization device and the second medical visualization device are different, wherein the electronic memory stores device data enabling compatibility of the video processing apparatus with at least some of the plurality of medical visualization devices, the device data includes first device data enabling compatibility with the first medical visualization device and second device data enabling compatibility with the second medical visualization device, wherein the electronic memory stores activation data including first activation data corresponding to the first device data and second activation data corresponding to the second device data, wherein the video processing apparatus, while receiving the image data from the first medical visualization device: in accordance with the first activation data being indicative of the first device data being deactivated, displays the live representation of the image data together with displaying a message indicating non-compliance of the first medical visualization device, in accordance with the first activation data being indicative of the first device data being activated, displays the live representation of the image data without displaying the message indicating non-compliance of the first medical visualization device.

7. Video processing apparatus according to item 6 as dependent on item 4, wherein the video processing apparatus while receiving the image data from the first medical visualization device, in accordance with the first activation data being indicative of the first device data being deactivated, the image data file includes a message indicating non-compliance of the first medical visualization device.

8. Control device according to any of items 6-7, wherein the video processing apparatus is adapted to receive an activation code input corresponding to an activation code, and, in accordance with a determination that the activation code input corresponds to an internal activation code for the second device data, the video processing apparatus alters the second activation data to be indicative of the second device data being activated.

9. Video processing apparatus according to item 8, wherein the internal activation code is based on the information of an acceptable country being registered for the video processing apparatus.

10. Video processing apparatus according to any of items 8-9, wherein the video processing apparatus is adapted to receive the activation code input in accordance with the electronic memory storing information of an acceptable country being registered for the video processing apparatus, and wherein, in accordance with the electronic memory storing information of an acceptable country not being registered for the video processing apparatus, the video processing apparatus is adapted not to receive the activation code input.

11. Video processing apparatus according to any of items 8-10, wherein receiving the activation code input includes scanning an optical code.

12. Video processing apparatus according to item 11 comprising an optical scanner, wherein the processing unit is connected to the optical scanner, and wherein receiving the activation code input includes scanning the optical code with the optical scanner and identifying the activation code in the optical code.

13. Video processing apparatus according to any of items 6-12, wherein the video processing apparatus is adapted to detect one or more user inputs corresponding to a request to show information for retrieving an activation code, and, in response to detecting the one or more user inputs corresponding to the request to show information for retrieving the activation code, displaying a retrieval code to be provided to a companion device, and wherein the retrieval code prompts the companion device to contact an online resource to retrieve the activation code.

14. Video processing apparatus according to item 13, wherein the retrieval code is based on the information of the acceptable country being registered for the video processing apparatus, and wherein prompting the companion device to contact the online resource includes parsing the information of the acceptable country being registered for the video processing apparatus to the online resource.

15. A medical visualization system comprising a video processing apparatus according to any of the preceding items and the one or more medical visualization devices.

The scope of the invention is not limited to the illustrated embodiments. Alterations and modifications can be carried out without deviating from the scope of the invention.

Throughout the description, the use of the terms "first", "second", "third", "fourth", "primary", "secondary", "tertiary" etc. does not imply any particular order or importance but are included to identify individual elements. Furthermore, the labelling of a first element does not imply the presence of a second element and vice versa.

LIST OF REFERENCES 2 medical visualization system
4 visualization device
6 handle
7 control mechanism
8 insertion cord
9 bending section
10 distal cord portion
12 image sensor
13 light emitter
14 device cable
16 device connector
20 video processing apparatus
21 first housing side
22 second housing side
23 third housing side
24 fourth housing side
25 first housing 26 touch sensitive display
27 graphical user interface
31 first portion
32 second portion
33 third portion
34 fourth portion
36 actionable item(s)
36a image capture button
36b video capture button
37 first image direction
38 second image direction
40 connection port(s)
42 actionable menu item(s)
50 battery indicator
60 processing unit
61 power unit
61a battery
61b power connection
62 memory
64 orientation sensor
66 input/output
68 microphone
69 optical scanner
70 live representation of image data
80 companion device
102 language selection dialogue box
104 language selection elements
106 confirmation button
112 country selection dialogue box
114 country selection elements
116 confirmation button
118 skip button
120, 120' message
130 device info screen
132 country selection
134 user input
136 information box
138 user input
140 code entry field
142 virtual keyboard
144 confirmation box
150 list of supported devices
152 user input
154 information box
156 retrieval code
158 user input
160 code entry field
162 virtual keyboard
164 confirmation box
170 retrieval user interface
171, 172, 173 entry field
174 confirmation button
175 activation code(s)
176 optical code
200, 200' message
x1 first direction
x2 second direction
L1 first length
L2 second length

We claim:

1. A video processing apparatus comprising:
a housing,
memory,
a processing unit connected to the memory,
wherein the processing unit is configured to:
receive image data from one or more medical visualization devices,
cause a display to display a graphical user interface and a live representation of the image data,
in accordance with the memory storing information indicative of an acceptable country not being registered for the video processing apparatus, cause the display to display the live representation of the image data together with a message indicating non-compliance of the video processing apparatus due to lack of registration of an acceptable country for the video processing apparatus, and
in accordance with the memory storing information indicative of an acceptable country being registered for the video processing apparatus, cause the display to display the live representation of the image data without displaying the message.

2. The video processing apparatus of claim 1, wherein the video processing apparatus is configured to, after being turned on and before displaying the live representation of the image data, in accordance with the memory storing information of an acceptable country not being registered for the video processing apparatus, display a country selection dialogue box comprising a plurality of country selection elements respectively corresponding to a plurality of countries, wherein the video processing apparatus is adapted to detect one or more user inputs corresponding to selection of a first country selection element of the plurality of country selection elements, wherein the first country selection element corresponds to a first country of the plurality of countries, and, in response to detecting the one or more user inputs corresponding to selection of the first country selection element, the processing unit is configured to store information in the memory of the first country being registered for the video processing apparatus.

3. The video processing apparatus of claim 1, wherein the video processing apparatus is adapted to receive a password input corresponding to a reset password, and, in accordance with a determination that the password input corresponds to an internal reset password, the video processing apparatus is configured to delete the information in the memory of an acceptable country being registered for the video processing apparatus, wherein the internal reset password is based on a serial number of the video processing apparatus and a present date.

4. The video processing apparatus of claim 1, wherein the video processing apparatus is configured to detect a user input corresponding to activation of an image capture function, and, in response to detection of the user input corresponding to activation of the image capture function, the video processing apparatus is configured to store in the memory an image data file corresponding to the image data received when the user input corresponding to activation of the image capture function was detected.

5. The video processing apparatus of claim 1, wherein the video processing apparatus is adapted to detect a user input corresponding to activation of an image capture function, and, in response to detection of the user input corresponding to activation of the image capture function, the video processing apparatus is configured to store in the memory an image data file corresponding to the image data received when the user input corresponding to activation of the image capture function was detected, and wherein in accordance with the memory storing information of an acceptable country not being registered for the video processing apparatus, the image data file includes a message indicating non-compliance of the video processing apparatus due to lack of registration of an acceptable country for the video processing apparatus.

6. The video processing apparatus of claim 1, wherein the video processing apparatus is adapted to detect a user input corresponding to activation of an image capture function, and, in response to detection of the user input corresponding to activation of the image capture function, the video processing apparatus is configured to store in the memory an image data file corresponding to the image data received when the user input corresponding to activation of the image capture function was detected, and wherein in accordance with the memory storing information of an acceptable country not being registered for the video processing apparatus, the video processing apparatus is configured to add to the image data file an indicator corresponding to lack of registration of an acceptable country for the video processing apparatus.

7. The video processing apparatus of claim 6, wherein the video processing apparatus is configured to read the image data file from the memory, and responsive to the image data file including the indicator corresponding to lack of registration of an acceptable country for the video processing apparatus, the video processing apparatus is configured to cause presentation with a display of images in the image data file and a message indicating non-compliance of the video processing apparatus due to lack of registration of an acceptable country for the video processing apparatus.

8. The video processing apparatus of claim 4, wherein the one or more medical visualization devices comprise a first medical visualization device and a second medical visualization device, wherein the first medical visualization device and the second medical visualization device are different, wherein the memory is configured to store first device data and second device data, enabling compatibility of the video processing apparatus with the first medical visualization device and the second medical visualization device, wherein the memory is configured to store activation data including first activation data corresponding to the first device data and second activation data corresponding to the second device data, and wherein the video processing apparatus, while receiving the image data from the first medical visualization device:
   in accordance with the first activation data being indicative of the first device data being deactivated, is configured to display the live representation of the image data together with a message indicating non-compliance of the first medical visualization device, and
   in accordance with the first activation data being indicative of the first device data being activated, is configured to display the live representation of the image data without displaying the message indicating non-compliance of the first medical visualization device.

9. The video processing apparatus of claim 8, wherein the video processing apparatus, while receiving the image data from the first medical visualization device, in accordance with the first activation data being indicative of the first device data being deactivated, is configured to include in the image data file includes a message indicating non-compliance of the first medical visualization device.

10. The video processing apparatus of claim 1, wherein the video processing apparatus is configured to detect a user input corresponding to activation of an image capture function, and, in response to detection of the user input corresponding to activation of the image capture function, the video processing apparatus is configured to store in the memory an image data file corresponding to the image data received when the user input corresponding to activation of the image capture function was detected, wherein the one or more medical visualization devices comprise a first medical visualization device, wherein the memory stores first device data enabling compatibility of the video processing apparatus with the first medical visualization device, wherein the memory is configured to store first activation data corresponding to the first device data, and wherein the video processing apparatus, while receiving the image data from the first medical visualization device is configured to:
   in accordance with the first activation data being indicative of the first device data being deactivated, display the live representation of the image data together with a message indicating non-compliance of the first medical visualization device, and
   in accordance with the first activation data being indicative of the first device data being activated, display the live representation of the image data without displaying the message indicating non-compliance of the first medical visualization device.

11. The video processing apparatus of claim 10, wherein the video processing apparatus is configured to, while receiving the image data from the first medical visualization device, in accordance with the first activation data being indicative of the first device data being deactivated, include in the image data file includes a message indicating non-compliance of the first medical visualization device.

12. The video processing apparatus of claim 10, wherein the video processing apparatus is configured to, while receiving the image data from the first medical visualization device, in accordance with the first activation data being indicative of the first device data being deactivated, include in the image data file an indicator indicating non-compliance of the first medical visualization device.

13. The video processing apparatus of claim 10, wherein the video processing apparatus is configured to receive an activation code input corresponding to an activation code, and, in accordance with a determination that the activation code input corresponds to an internal activation code for the first device data, the video processing apparatus is configured to alter the first activation data to be indicative of the first device data being activated.

14. The video processing apparatus according to claim 13, wherein the internal activation code is based on the information of an acceptable country being registered for the video processing apparatus.

15. The video processing apparatus of claim 13, wherein the video processing apparatus is configured to receive the activation code input in accordance with the memory storing information of an acceptable country being registered for the video processing apparatus, and wherein, in accordance with the memory storing information of an acceptable country not being registered for the video processing apparatus, the video processing apparatus is configured not to receive the activation code input.

16. The video processing apparatus of claim 13, wherein receiving the activation code input includes scanning an optical code and identifying the activation code in the optical code.

17. The video processing apparatus of claim 16, wherein the video processing apparatus comprises an optical scanner, and wherein receiving the activation code input includes scanning the optical code with the optical scanner.

18. The video processing apparatus of claim 1, wherein the video processing apparatus is configured to detect one or more user inputs corresponding to a request to show information for retrieving an activation code, and, in response to detecting the one or more user inputs corresponding to the request to show information for retrieving the activation code, to display a retrieval code to be provided to a companion device, and wherein the retrieval code is configured to prompt the companion device to contact an online resource to retrieve the activation code.

19. The video processing of claim 18, wherein the retrieval code is based on the information of the acceptable country being registered for the video processing apparatus, and wherein prompting the companion device to contact the online resource includes parsing the information of the acceptable country being registered for the video processing apparatus to the online resource.

20. The video processing apparatus of claim 1, wherein the one or more medical visualization devices comprise a first medical visualization device, wherein the video processing apparatus is configured to receive an activation code input corresponding to an activation code, to determine whether the activation code input corresponds to an internal activation code associated with the first medical visualization device, and if the activation code input corresponds with the internal activation code, to store a first activation data to be indicative of the first medical visualization device being activated, wherein the video processing apparatus is configured to detect a user input corresponding to activation of an image capture function, and, in response to detection of the user input corresponding to activation of the image capture function and the medical visualization device being activated, the video processing apparatus is configured to store in the memory an image data file corresponding to the image data received when the user input corresponding to activation of the image capture function was detected.

21. A medical visualization system comprising the video processing apparatus of claim 1 and the one or more medical visualization devices.

* * * * *